United States Patent
Choi et al.

(10) Patent No.: US 12,236,622 B2
(45) Date of Patent: Feb. 25, 2025

(54) STATISTIC GENERATING CIRCUIT FOR IMAGE PROCESSING

(71) Applicant: SAMSUNG ELECTRONICS CO., LTD., Suwon-si (KR)

(72) Inventors: Dong-Bum Choi, Suwon-si (KR); Il Do Kim, Suwon-si (KR); Dong Woo Lee, Yongin-si (KR); Na-Ri Im, Suwon-si (KR); Kyu Yul Choi, Yongin-si (KR); Jong Seong Choi, Hwaseong-si (KR); Suk Hwan Lim, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 411 days.

(21) Appl. No.: 17/688,195

(22) Filed: Mar. 7, 2022

(65) Prior Publication Data

US 2023/0108491 A1   Apr. 6, 2023

(30) Foreign Application Priority Data

Sep. 17, 2021   (KR) .......................... 10-2021-0124794

(51) Int. Cl.
*G06T 7/41*   (2017.01)
*G06T 7/80*   (2017.01)

(52) U.S. Cl.
CPC .................. *G06T 7/41* (2017.01); *G06T 7/85* (2017.01); *G06T 2207/10012* (2013.01)

(58) Field of Classification Search
None
See application file for complete search history.

(56) References Cited

U.S. PATENT DOCUMENTS

| | | | |
|---|---|---|---|
| 7,609,766 B2 | 10/2009 | Zeng | |
| 8,330,772 B2 * | 12/2012 | Cote | G06T 3/4015 345/611 |
| 8,488,055 B2 | 7/2013 | Cote et al. | |
| 8,953,882 B2 * | 2/2015 | Lim | H04N 17/002 348/241 |
| 9,131,196 B2 | 9/2015 | Lim et al. | |
| 10,063,834 B2 | 8/2018 | Callway | |
| 10,097,765 B2 | 10/2018 | Sheikh et al. | |
| 10,547,863 B1 * | 1/2020 | Wang | H04N 19/513 |
| 10,616,511 B2 | 4/2020 | Ain-Kedem et al. | |
| 10,861,127 B1 | 12/2020 | Terree et al. | |
| 10,868,985 B2 | 12/2020 | Lin et al. | |
| 10,916,036 B2 | 2/2021 | Nikkanen et al. | |
| 11,043,285 B2 * | 6/2021 | Rooyen | H03K 19/17736 |

(Continued)

*Primary Examiner* — Tahmina N Ansari
(74) *Attorney, Agent, or Firm* — Fish & Richardson P.C.

(57) ABSTRACT

An image signal processor includes a statistic data generating unit for receiving an image signal from an external device, an image processing unit for receiving the image signal, and a direct memory access (DMA) module connected to the statistic data generating unit and the image processing unit. The statistic data generating unit performs first image pre-processing on the image signal and generates first statistic data based on the image signal subjected to the first image pre-processing. The DMA module stores the first statistic data therein and provides the stored first statistic data to the image processing unit. The image processing unit performs second image pre-processing on the image signal and performs image processing on the image signal based on the first statistic data.

20 Claims, 30 Drawing Sheets

(56) References Cited

U.S. PATENT DOCUMENTS

| | | | |
|---|---|---|---|
| 2011/0090380 A1* | 4/2011 | Cote | H04N 25/611 |
| | | | 348/246 |
| 2013/0321673 A1* | 12/2013 | Lim | H04N 17/002 |
| | | | 348/241 |
| 2020/0053377 A1* | 2/2020 | Wang | H04N 19/176 |
| 2023/0108491 A1* | 4/2023 | Choi | H04N 23/80 |
| | | | 382/108 |

* cited by examiner

| R2 | G4 | R4 | G8 |
|----|----|----|----|
| G3 | B2 | G7 | B4 |
| R1 | G2 | R3 | G6 |
| G1 | B1 | G5 | B3 |

FIG. 17A

STATISTIC GENERATING CIRCUIT FOR IMAGE PROCESSING

CROSS-REFERENCE TO RELATED APPLICATION

This application claims priority from Korean Patent Application No. 10-2021-0124794 filed on Sep. 17, 2021, in the Korean Intellectual Property Office and all the benefits accruing therefrom under 35 U.S.C. 119, the contents of which in its entirety are herein incorporated by reference.

BACKGROUND

Field of the Invention

The present disclosure relates to an image signal processor, an image sensing device, an image sensing method, and an electronic device.

Description of Related Art

An image sensing device is one of semiconductor devices that converts optical information into an electrical signal. The image sensing device may include a CCD (charge-coupled device) based image sensing device and a CMOS (complementary metal-oxide semiconductor) based image sensing device.

A CMOS image sensor may be abbreviated as CIS (CMOS image sensor). The CIS may include a plurality of pixels that are two-dimensionally arranged. Each of the pixels may include, for example, a photodiode (PD). The photodiode may serve to convert incident light thereto into an electrical signal.

Recently, with development of the computer industry and communication industry, demand for the image sensor with improved performance is increasing in various fields such as digital cameras, camcorders, smartphones, game devices, security cameras, medical micro cameras, and robots.

SUMMARY

A technical purpose of the present disclosure is to provide an image signal processor having reduced power consumption.

A technical purpose of the present disclosure is to provide an image sensing device having reduced power consumption.

A technical purpose of the present disclosure is to provide an image sensing method having reduced power consumption.

A technical purpose of the present disclosure is to provide an electronic device having reduced power consumption.

Purposes according to the present disclosure are not limited to the above-mentioned purposes. Other purposes and advantages according to the present disclosure that are not mentioned may be understood based on following descriptions and may be more clearly understood based on embodiments according to the present disclosure. Further, it will be easily understood that the purposes and advantages according to the present disclosure may be realized using means shown in the claims and combinations thereof.

According to an aspect of the present disclosure, there is provided an image signal processor having a statistic data generating unit for receiving an image signal from an external device, an image processing unit for receiving the image signal, and a direct memory access (DMA) module connected to the statistic data generating unit and the image processing unit. The statistic data generating unit performs first image pre-processing on the image signal and generates first statistic data based on the image signal subjected to the first image pre-processing. The DMA module stores the first statistic data therein and provides the stored first statistic data to the image processing unit. The image processing unit performs second image pre-processing on the image signal and performs image processing on the image signal based on the first statistic data.

According to an aspect of the present disclosure, there is provided an image sensing device having a first camera module including a first image sensor generating a first image signal a second camera module including a second image sensor generating a second image signal. A statistic data generating unit is configured to receive the first and second image signals, generate first statistic data based on the first image signal, and generate second statistic data based on the second image signal. An image processing unit is configured to select one of the first and second image signals and perform image processing on the selected one of the first and second image signals based on the first and second statistic data.

According to an aspect of the present disclosure, there is provided a method for sensing an image, the method includes: (1) outputting, by an image sensor, an image signal of a first frame for a first time period, (2) receiving, by an image signal processor, the image signal of the first frame, (3) generating, by the image signal processor, first statistic data based on the image signal of the first frame for a second time period partially overlapping the first time period, and (4) performing, by the image signal processor, image processing on the image signal of the first frame based on the first statistic data for a third time period that is subsequent to the first and second time periods and non-overlapping with the second time period.

According to an aspect of the present disclosure, there is provided an electronic device having a camera module including: (1) an image sensor for generating an image signal in response to reception of light and (2) a statistic data generating unit for generating statistic data based on the image signal. An application processor connected to the camera module includes an image processing unit configured to receive the image signal and the statistic data from the camera module and perform image processing on the image signal based on the statistic data.

Specific details of other embodiments are included in detailed descriptions and drawings.

BRIEF DESCRIPTION OF DRAWINGS

The above and other aspects and features of the present disclosure will become more apparent by describing in detail exemplary embodiments thereof with reference to the attached drawings, in which:

FIG. 4 is a diagram for illustrating the pixel array of FIG. 3.

Figure 17A:
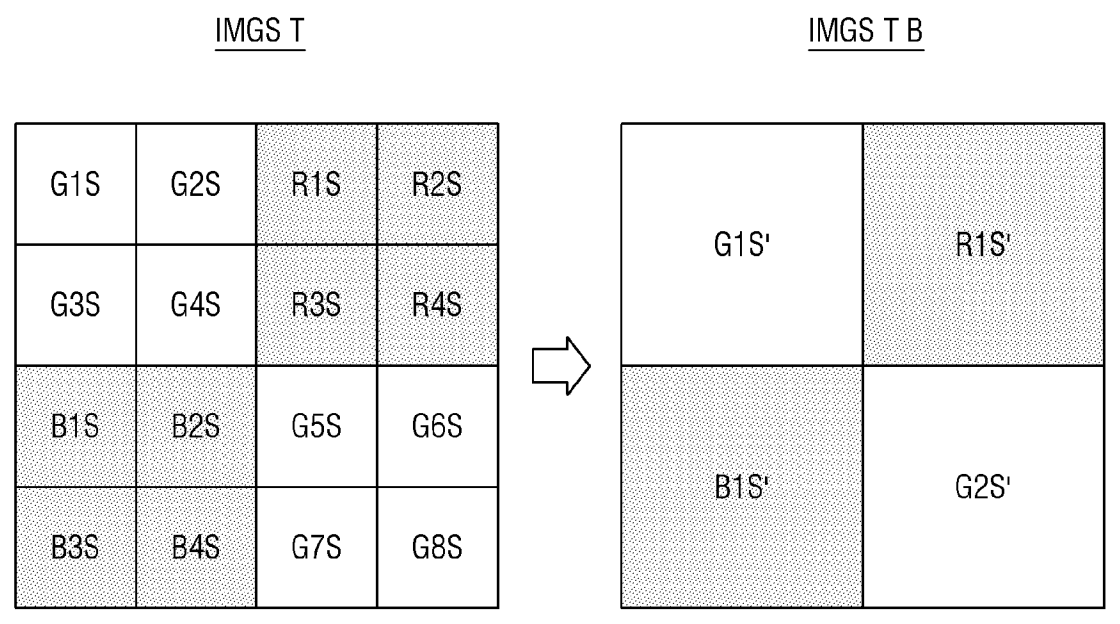

FIG. 17A to FIG. 17C are diagrams for illustrating an operation of the binning module in FIG. 16.

DETAILED DESCRIPTIONS

Embodiments according to the technical idea of the present disclosure will be described with reference to the accompanying drawings.

Figure 1:
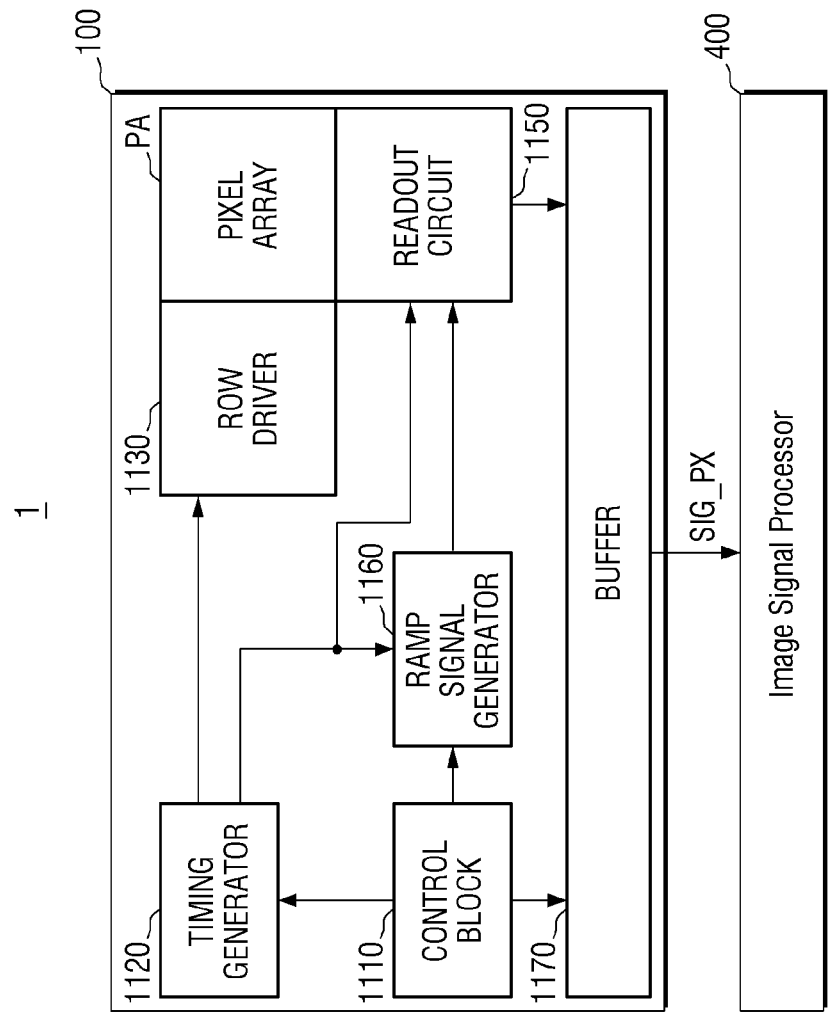
FIG. 1 is a block diagram of an image sensing device according to some embodiments.

FIG. 1 is a block diagram of an image sensing device according to some embodiments.

Referring to FIG. 1, an image sensing device 1 may include an image sensor 100 and an image signal processor 400.

The image sensor 100 may sense an image of a sensing target using light and may generate a pixel signal SIG_PX based on the sensed image. In some embodiments, the generated pixel signal SIG_PX may be, for example, a digital signal. However, an embodiment according to the technical idea of the present disclosure is not limited thereto.

The pixel signal SIG_PX may be provided to the image signal processor 400 for processing thereof. The image signal processor 400 may receive the pixel signal SIG_PX output from a buffer 1170 of the image sensor 100 and process the received pixel signal SIG_PX for displaying thereof.

In some embodiments, the image signal processor 400 may perform digital binning on the pixel signal SIG_PX output from the image sensor 100. In this connection, the pixel signal SIG_PX output from the image sensor 100 may be a raw image signal from a pixel array PA that is not subjected to analog binning or may be a pixel signal SIG_PX subjected to analog binning.

In some embodiments, the image sensor 100 and the image signal processor 400 may be disposed separately from each other as shown. For example, the image sensor 100 may be mounted on a first chip, while the image signal processor 400 may be mounted on a second chip. In this case, the image sensor 100 and the image signal processor 400 may communicate with each other via a predefined interface. However, embodiments are not limited thereto. The image sensor 100 and the image signal processor 400 may be implemented in one package, for example, an MCP (multi-chip package).

The image sensor 100 may include a control register block 1110, a timing generator 1120, a row driver 1130, the pixel array PA, a read-out circuit 1150, a ramp signal generator 1160, and the buffer 1170.

The control register block 1110 may control overall operations of the image sensor 100. In particular, the control register block 1110 may transmit an operation signal directly to the timing generator 1120, the ramp signal generator 1160 and the buffer 1170.

The timing generator 1120 may generate a signal as a reference for an operation timing of various components of the image sensor 100. The operation timing reference signal generated by the timing generator 1120 may be transmitted to the row driver 1130, the read-out circuit 1150, the ramp signal generator 1160, and the like.

The ramp signal generator 1160 may generate and transmit a ramp signal used in the read-out circuit 1150. For example, the read-out circuit 1150 may include a correlated double sampler (CDS), a comparator, etc. The ramp signal generator 1160 may generate and transmit a ramp signal used in the correlated double sampler (CDS), the comparator, and the like.

The buffer 1170 may include, for example, a latch unit. The buffer 1170 may temporarily store therein the pixel signal SIG_PX to be provided to an external component and may transmit the pixel signal SIG_PX to an external memory or an external device. The buffer 1170 may include a memory such as DRAM or SRAM.

The pixel array PA may sense an external image. The pixel array PA may include a plurality of pixels (or unit pixels). The row driver 1130 may selectively activate a row of the pixel array PA.

The read-out circuit 1150 may sample the pixel signal provided from the pixel array PA, compare the sampled signal with the ramp signal, and convert an analog image signal (data) into a digital image signal (data), based on the comparison result.

Figure 2:
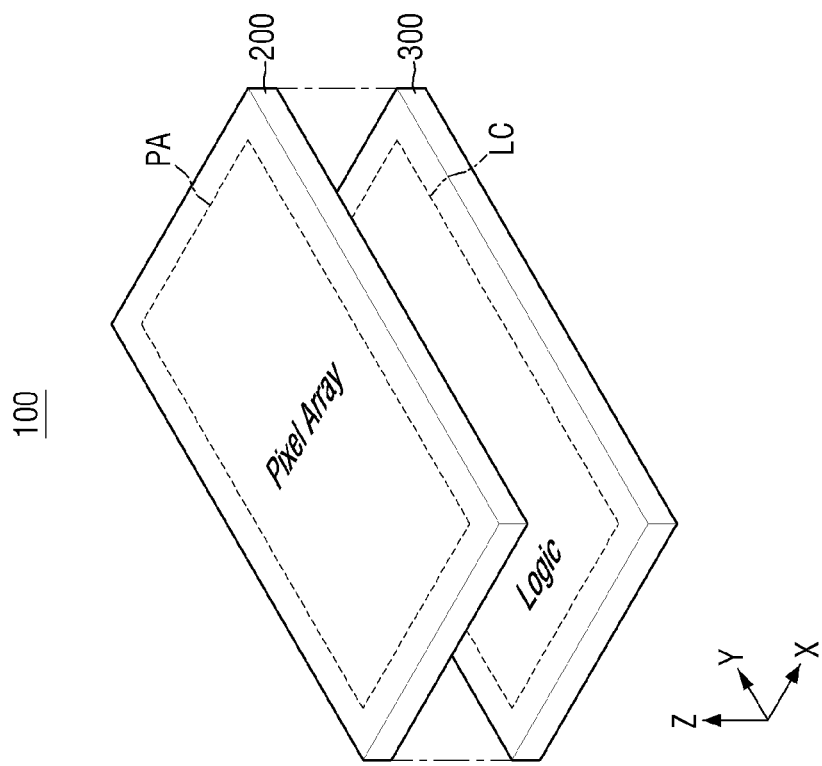
FIG. 2 is a diagram illustrating a conceptual layout of an image sensor according to some embodiments.

FIG. 2 is a diagram illustrating a conceptual layout of an image sensor according to some embodiments.

Referring to FIG. 2, the image sensor 100 according to this embodiment may include an upper chip 200 and a lower chip 300 as stacked vertically. In the upper chip 200, a plurality of pixels may be arranged in a two-dimensional array structure. That is, the upper chip 200 may include the pixel array PA. The lower chip 300 may include a logic area (LC) and a memory area. The lower chip 300 may be disposed below the upper chip 200 and may be electrically connected to the upper chip 200. The lower chip 300 may receive the pixel signal transmitted from the upper chip 200 and transmit the received pixel signal to the logic area LC of the lower chip 300.

The logic elements may be disposed in the logic area LC of the lower chip 300. The logic elements may include circuits for processing the pixel signal from the pixels. For example, the logic elements may include the control register block 1110, the timing generator 1120, the row driver 1130, the read-out circuit 1150, and the ramp signal generator 1160 of FIG. 1.

Figure 3:
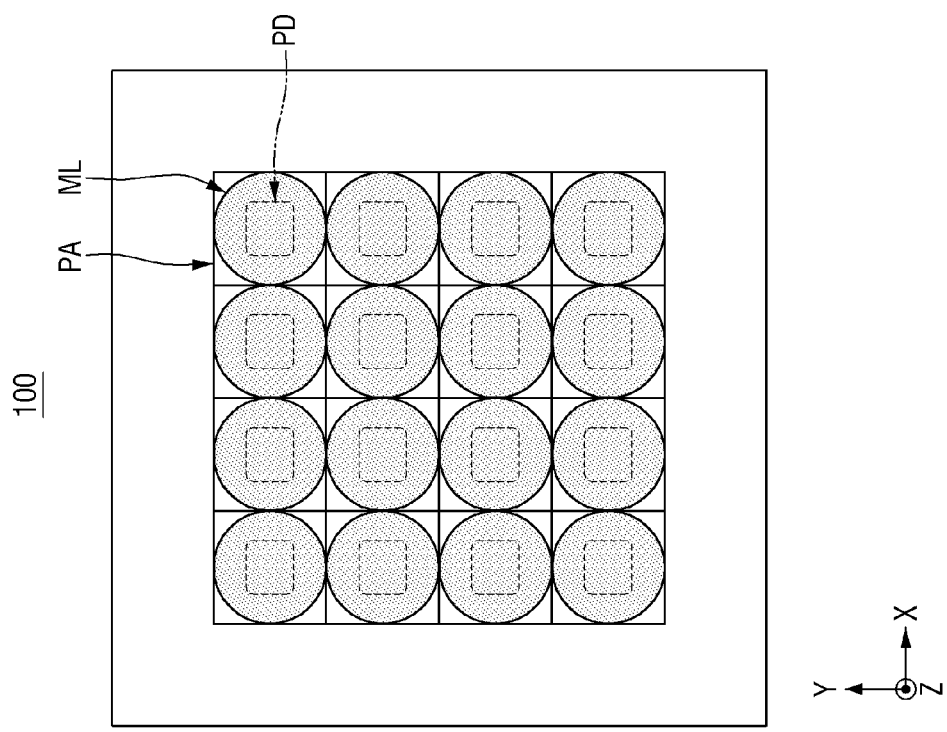
FIG. 3 is a top view of an image sensor according to some embodiments.
Figure 4:
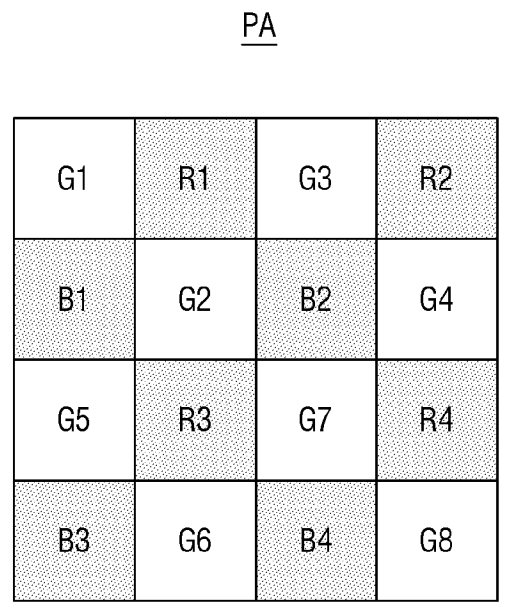

FIG. 3 is a top view of an image sensor according to some embodiments. FIG. 4 is a diagram for illustrating the pixel array of FIG. 3.

Referring to FIG. 3, the pixel array PA may be disposed in a top face of the image sensor 100. In detail, the pixel array PA may be disposed in a top face of the upper chip 200 of the image sensor 100. The pixel array PA may receive incident light. In this connection, the pixel array PA may include each photodiode PD and each micro-lens ML disposed in each pixel. The photodiode PD may be disposed in a substrate that is included in the pixel array PA. The photodiode PD may act as a photoelectric converter and may convert light incident on the pixel array PA to charges. The micro-lens ML may be disposed per the photodiode PD. That is, the micro-lens ML may be disposed per each pixel of the pixel array PA and may receive light. Light passing through the micro-lens ML may be transmitted to the photodiode PD. In this drawing, the pixels of the pixel array PA are shown as being regularly arranged in a first direction X and a second direction Y. However, an embodiment of the present disclosure is not limited thereto.

Referring to FIG. 4, the pixel array PA may include first to eighth green pixels G1 to G8, first to fourth blue pixels B1 to B4, and first to fourth red pixels R1 to R4. A plurality of pixels of the pixel array PA may be arranged in an RGB Bayer pattern. For example, the green pixels including the first to eighth green pixels G1 to G8 may surround the blue pixels including the first to fourth blue pixels B1 to B4 and the red pixels including the first to fourth red pixels R1 to R4. As described above, the plurality of pixels of the pixel array PA may be regularly arranged. However, an embodiment of the present disclosure is not limited thereto. The pixels of the pixel array PA may be arranged in an RGB tetra or nona pattern.

The first to eighth green pixels G1 to G8 may respectively output first to eighth green pixel signals. The first to fourth blue pixels B1 to B4 may respectively output first to fourth blue pixel signals. The first to fourth red pixels R1 to R4 may respectively output first to fourth red pixel signals. That is, the image signal or the pixel signal SIG_PX of one frame output from the pixel array PA may include the first to eighth green pixel signals, the first to fourth blue pixel signals, and the first to fourth red pixel signals.

Figure 5:
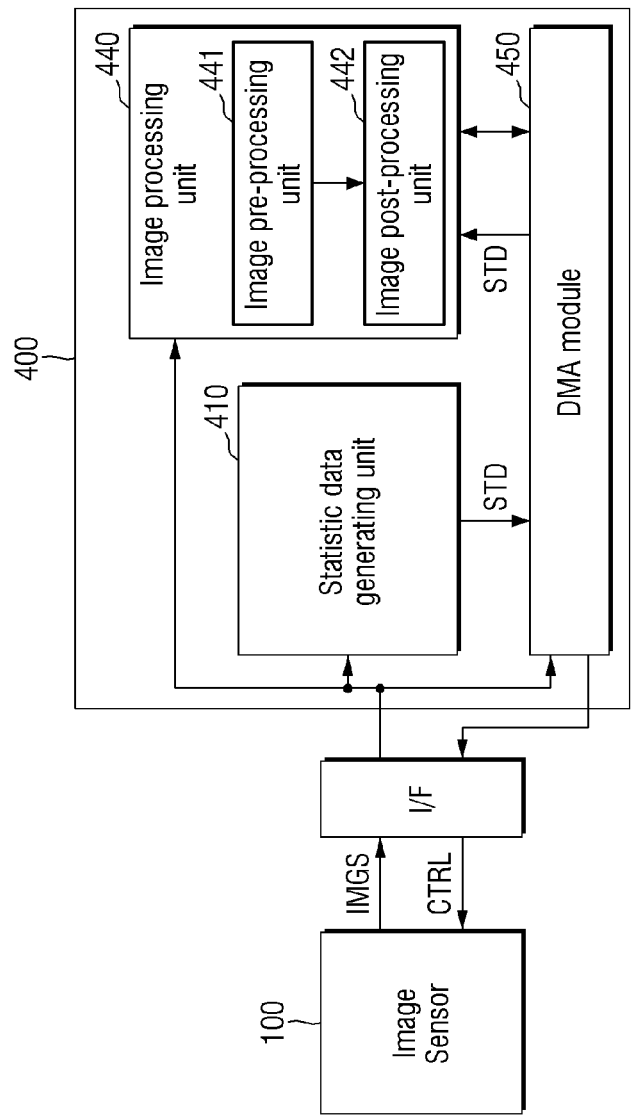
FIG. 5 is a block diagram of an image sensing device according to some embodiments.

FIG. 5 is a block diagram of an image sensing device according to some embodiments.

Referring to FIG. 5, the image sensing device 1 may include the image sensor 100, an interface device I/F, and the image signal processor 400.

As described above, the image sensor 100 may generate and output an image signal IMGS based on a sensing result of the sensing target. In this connection, the image signal IMGS may include information about an image of one frame. The output image signal IMGS may be transmitted to the interface device I/F. The interface device I/F may provide the image signal IMGS to the image signal processor 400.

The image signal processor 400 may include a statistic data generating unit 410, an image processing unit 440 and a DMA module (direct memory access module) 450. In this connection, the image signal processor 400 may be implemented by a processor such as a CPU or an ASIC. The statistic data generating unit 410, the image processing unit 440, and the DMA module 450 included in the image signal processor 400 may be implemented by a processor but are not limited to hardware.

The statistic data generating unit 410 may generate statistic data STD based on the image signal IMGS. In this connection, the statistic data generating unit 410 may receive the image signal IMGS in an OTF (on the fly) manner. A statistic data STD generating operation of the statistic data generating unit 410 may correspond to a statistic data generating pipeline. That is, the processor implementing the statistic data generating unit 410 may implement the statistic data generating pipeline. The statistic data generating pipeline may correspond to a pipeline generating only statistic data without performing image signal processing. The statistic data generating unit 410 may provide the generated statistic data STD to the DMA module 450.

In some embodiments, the statistic data STD may be used for control of the image sensing device 1 and image processing of the image processing unit 440. That is, the statistic data STD may be used to control the operation of the image sensor 100. For example, the DMA module 450 may generate a control signal CTRL based on the statistic data STD. The control signal CTRL may be transmitted to the image sensor 100. A camera module including the image sensor 100 may operate based on the control signal CTRL. Further, the statistic data STD may be temporarily stored in the DMA module 450. The stored statistic data STD may be transmitted to the image processing unit 440. The image processing unit 440 may perform image processing on the image signal IMGS using the statistic data STD.

Figure 6:
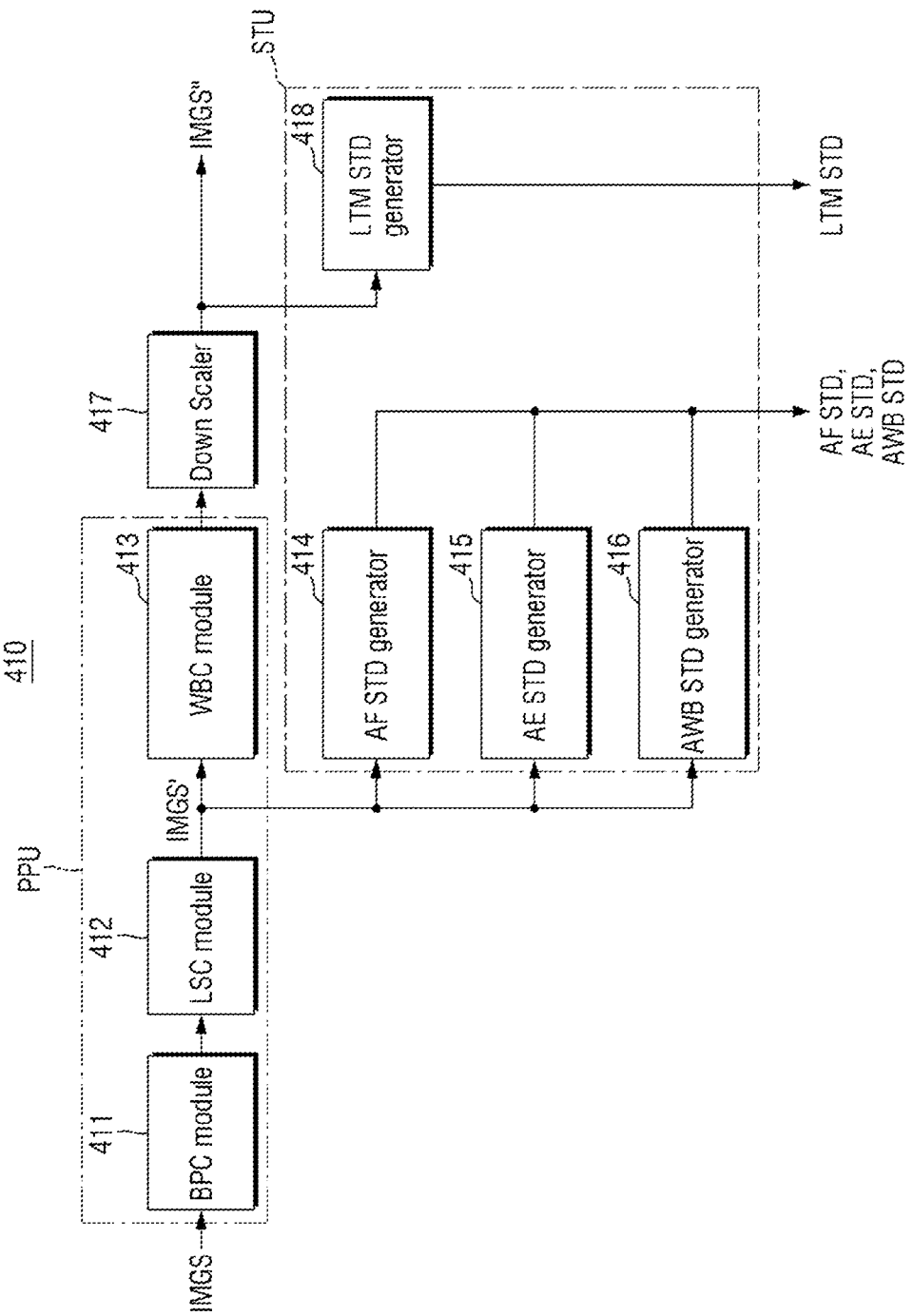
FIG. 6 and FIG. 7 are block diagrams of the statistic data generating module of FIG. 5.
Figure 7:
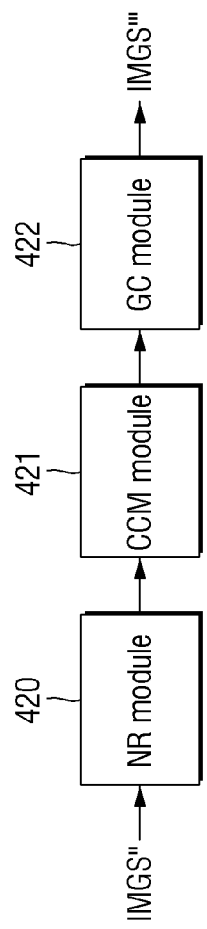
Figure 8:
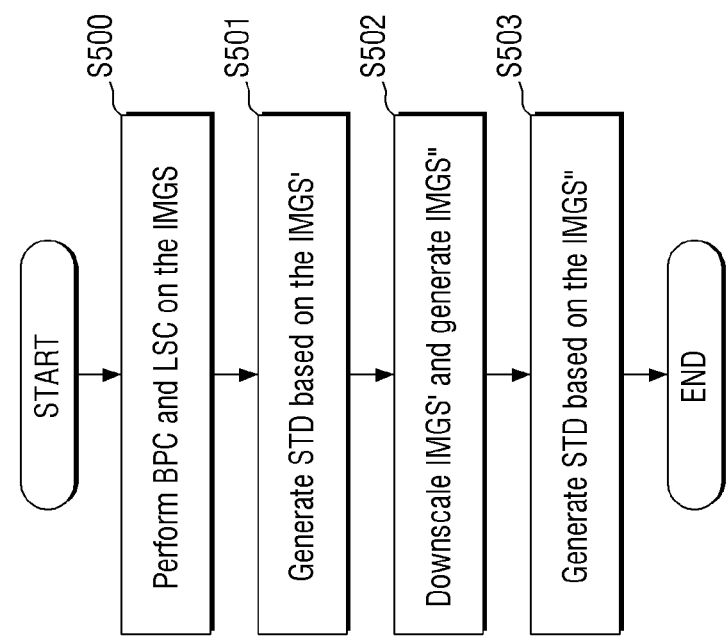
FIG. 8 is a flowchart of an operation method of a statistic data generating module according to some embodiments.

FIG. 6 and FIG. 7 are block diagrams of the statistic data generating module of FIG. 5. FIG. 8 is a flowchart of an operation method of a statistic data generating module according to some embodiments.

Referring to FIG. 6, the statistic data generating unit 410 may include a bad pixel correction module 411, a lens shading correction module 412, a white balance correction module 413, an AF statistic data generating module 414, an AE statistic data generating module 415, an AWB statistic data generating module 416, a down scaler 417 and an LTM statistic data generating module 418. In this connection, the components included in the statistic data generating unit 410 may be implemented by a processor and are not limited to hardware.

In some embodiments, the image pre-processing unit PPU may include the bad pixel correction module 411, the lens shading correction module 412 and the white balance correction module 413. The statistic data generating unit STU may include the AF statistic data generating module 414, the AE statistic data generating module 415, the AWB statistic data generating module 416 and the LTM statistic data generating module 418. In this connection, the image pre-processing unit PPU may act as a unit that performs image pre-processing on the image signal IMGS. The statistic data generating unit STU may act as a unit for generating the statistic data STD using the image signal IMGS. As will be described later, the image pre-processing unit PPU may be different from an image pre-processing unit 441 included in the image processing unit 440.

Referring to FIG. 6 and FIG. 8, the statistic data generating unit 410 may perform bad pixel correction and lens shading correction on the image signal IMGS in S500. The bad pixel correction module 411 may receive the image signal IMGS and may perform the bad pixel correction on the image signal IMGS. In this connection, the bad pixel correction module 411 may perform the bad pixel correction on the image signal IMGS based on bad pixel information stored in the memory of image sensing device 1. As a result, the bad pixel correction module 411 may output the image signal IMGS on which the bad pixel has been corrected.

Subsequently, the lens shading correction module 412 may perform lens shading correction on the image signal IMGS on which the bad pixel correction has been performed. The lens shading correction may correct a dark portion of a lens. The lens shading correction module 412 may perform lens shading correction on the image signal IMGS based on lens information of the image sensor 100 and may output a corrected image signal IMGS'.

The statistic data generating unit 410 may generate the statistic data STD based on the corrected image signal IMGS' in S501. For example, the statistic data generating unit 410 may generate AF statistic data AF STD, the AE statistic data AE STD, and AWB statistic data AWB STD based on the corrected image signal IMGS'.

The AF statistic data generating module 414 may generate the AF statistic data AF STD. The AF statistic data AF STD may include auto focus information about the corrected image signal IMGS'. In this connection, the AF statistic data generating module 414 may generate the AF statistic data AF STD based on the corrected image signal IMGS' having one frame.

The AE statistic data generating module 415 may generate the AE statistic data AE STD. The AE statistic data AE STD may include auto exposure information on the corrected image signal IMGS'. In this connection, the AE statistic data generating module 415 may generate the AE statistic data AE STD based on the corrected image signal IMGS' having one frame.

The AWB statistic data generating module 416 may generate the AWB statistic data AWB STD. The AWB statistic data AWB STD may include auto white balance information about the corrected image signal IMGS'. In this connection, the AWB statistic data generating module 416 may generate the AWB statistic data AWB STD based on the corrected image signal IMGS' having one frame.

The AF statistic data AF STD, the AE statistic data AE STD and the AWB statistic data AWB STD generated using the above process may be output from the statistic data generating unit 410 and delivered to the DMA module 450. The AF statistic data AF STD may be used for auto focus adjustment of the camera module including the image sensor 100. The AE statistic data AE STD may be used for auto exposure control of the camera module including the image sensor 100. The AWB statistic data AWB STD may be used for auto white balance adjustment of the camera module including the image sensor 100. Further, the AF statistic data AF STD, the AE statistic data AE STD and the AWB statistic data AWB STD may be used for image pre-processing and image post-processing. The AF statistic data AF STD, the AE statistic data AE STD, and the AWB statistic data AWB STD may be generated using all information of the image signal IMGS having one frame.

The white balance correction module 413 may perform white balance correction on the corrected image signal IMGS'. White balance correction means adjusting overall brightness and color-temperature of the corrected image signal IMGS'. The white balance correction module 413 may output the corrected image signal IMGS' on which the white balance correction has been performed.

The down scaler 417 may downscale the corrected image signal IMGS' received from the white balance correction module 413 to generate a corrected image signal IMGS" in S502. In this connection, the down scaler 417 may reduce data capacity of the corrected image signal IMGS' via digital binning or interpolation. As the data capacity of the corrected image signal IMGS" is reduced, power used by the statistic data generating unit 410 in a subsequent process may be further reduced. That is, power consumption of the image signal processor 400 may be reduced by the down scaler 417.

The statistic data generating unit 410 may generate the statistic data STD based on the corrected image signal IMGS" in S503. For example, the LTM statistic data generating module 418 may generate the LTM statistic data LTM STD based on the corrected image signal IMGS". The LTM statistic data LTM STD may act as statistic data used for local tone mapping. The LTM statistic data LTM STD may be generated based on the corrected image signal IMGS" having one frame.

In summary, the statistic data generating unit 410 may generate the statistic data STD based on the image signal IMGS. In this connection, the statistic data STD may include the AF statistic data AF STD, the AE statistic data AE STD, the AWB statistic data AWB STD and the LTM statistic data LTM STD as described above. However, an embodiment of the present disclosure is not limited thereto. The statistic data STD may include motion measurement statistic data related to motion measurement, facial recognition statistic data related to face recognition, and the like.

Referring to FIG. 7, the statistic data generating unit 410 may include a noise reduction module 420, a color conversion matrix module 421 and a gamma correction module 422. The noise reduction module 420, the color conversion matrix module 421 and the gamma correction module 422 may perform correction on the corrected image signal IMGS" to generate a corrected image signal IMGS'''. However, an embodiment of the present disclosure is not limited thereto. The statistic data generating unit 410 may not include the noise reduction module 420, the color conversion matrix module 421 and the gamma correction module 422. Further, the statistic data generating unit 410 may include only the bad pixel correction module 411, the AF statistic data generating module 414, the AE statistic data generating module 415, the AWB statistic data generating module 416 and the LTM statistic data generating module 418 as described with reference to FIG. 6. That is, the statistic data generating unit 410 may generate the statistic data STD using only a minimal number of components and, thus, the power consumption of the image sensing device 1 may be reduced.

Further, the statistic data generating unit 410 may act as the statistic data generating pipeline. That is, the statistic data generating unit 410 may generate only the statistic data STD and may not perform image processing. As the statistic data generating unit 410 only performs generation of the statistic data STD, the power consumption of the image sensing device 1 may be reduced.

Referring back to FIG. 5, the statistic data STD generated from the statistic data generating unit 410 may be transmitted to the DMA module 450. The statistic data STD temporarily stored in the DMA module 450 may be provided to the image processing unit 440. That is, the statistic data STD may be transferred in a M2M (memory to memory) manner via the DMA module 450.

The image processing unit 440 may include an image pre-processing unit 441 and the image post-processing unit 442. The image pre-processing unit 441 and the image post-processing unit 442 may perform different image processing on the image signal IMGS. In this connection, the image processing unit 440 may perform image processing using the statistic data STD. Further, the image processing unit 440 may act as the image processing pipeline. The image processing unit 440 may perform only image processing and may not perform statistic data generation.

Figure 9:
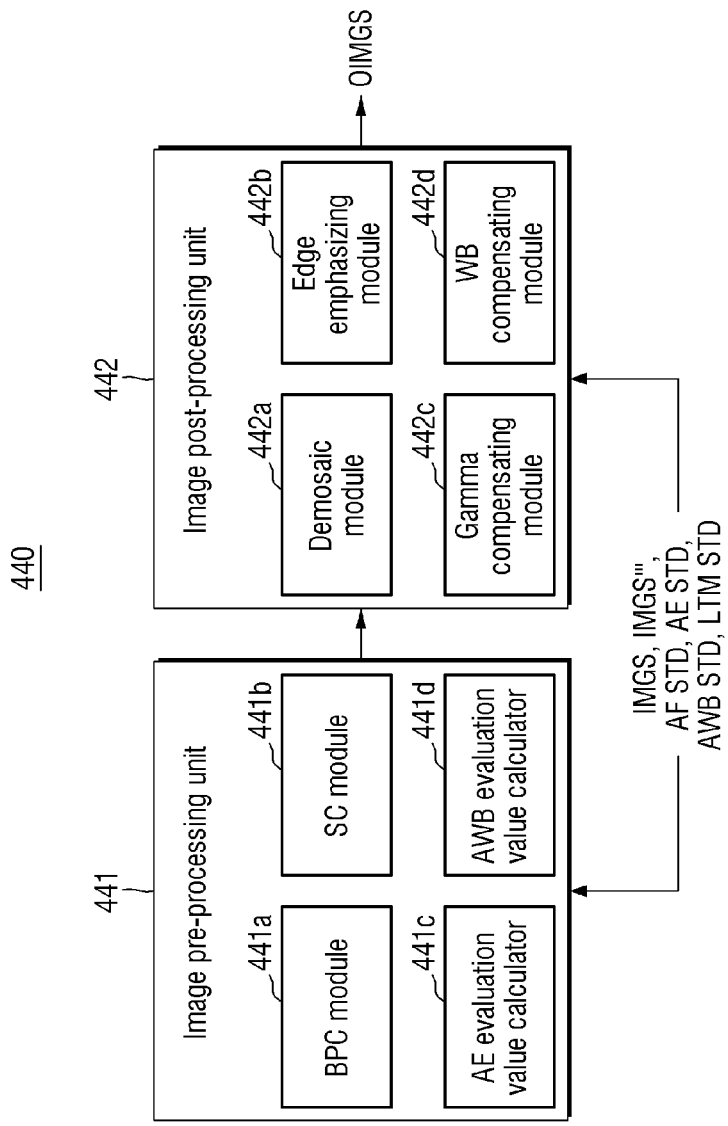
FIG. 9 is a block diagram of an image processing module of FIG. 5.

FIG. 9 is a block diagram of an image processing module of FIG. 5.

Referring to FIG. 9, the image pre-processing unit 441 may include a bad pixel correction module 441a, a shading correction module 441b, an AE evaluation value calculator 441c and an AWB evaluation value calculator 441d. The image pre-processing unit 441 may receive the image signal IMGS, the corrected image signal IMGS', the AF statistic data AF STD, the AE statistic data AE STD, the AWB statistic data AWB STD, and the LTM statistic data LTM STD from the DMA module 450 and the image sensor 100. The image pre-processing unit 441 may perform image pre-processing on the image signal IMGS and the corrected image signal IMGS'" based on the AF statistic data AF STD, the AE statistic data AE STD, the AWB statistic data AWB STD and the LTM statistic data LTM STD.

The bad pixel correction module 441a may correct a bad pixel of the image signal IMGS via interpolation. The shading correction module 441b may correct a difference in luminance of an image due to omission of luminance occurring around the image. In this connection, an operation of the bad pixel correction module 441a and an operation of the shading correction module 441b may be the same as the operation of the bad pixel correction module 411 and the lens shading correction module 412 in FIG. 6, respectively. That is, the bad pixel corrections of the statistic data generating unit 410 and the image pre-processing unit 441 may be independently performed. Further, the lens shading corrections of the statistic data generating unit 410 and the image pre-processing unit 441 may be independently performed. Further, the bad pixel corrections of the statistic data generating unit 410 and the image pre-processing unit 441 may be performed at different times. Further, the lens shading corrections of the statistic data generating unit 410 and the image pre-processing unit 441 may be performed at different times.

The AE evaluation value calculator 441c may calculate an AE evaluation value based on the corrected image signal IMGS. For example, the AE evaluation value calculator 441c may calculate the AE evaluation value indicating brightness by integrating a luminance value sensed by the image sensor 100. That is, the AE evaluation value calculator 441c may calculate the AE evaluation value using the AE statistic data AE STD. For example, the AE evaluation value may include a luminance value sensed by the image sensor 100.

The AWB evaluation value calculator 441d may calculate an AWB evaluation value using a specific algorithm based on the corrected image signal IMGS. For example, the AWB evaluation value may include a white balance gain used for white balance correction processing. For example, the AWB evaluation value may include a color-temperature value sensed by the image sensor 100. In this connection, the color-temperature value means that a color of the sensed light is expressed as a temperature. For example, a color-temperature value of a red color may be about 2000 degrees K. A color-temperature value of a blue light may be about 10000 degrees K. However, an embodiment according to the technical idea of the present disclosure is not limited thereto.

That is, the AWB evaluation value calculator 441d may calculate the AWB evaluation value using the AWB statistic data AWB STD.

The image signal IMGS, the AE evaluation value, and the AWB evaluation value on which have been corrected by the components of the image pre-processing unit 441 may be temporarily stored in the DMA module 450 or may be directly transmitted to the image post-processing unit 442.

The image post-processing unit 442 may perform image post-processing on the image signal IMGS on which image pre-processing has been performed by the image pre-processing unit 441. The image post-processing unit 442 may include a demosaic module 442a, an edge emphasizing module 442b, a gamma correction module 442c and a white balance compensating module 442d.

The demosaic module 442a may perform demosaic processing (Bayer color interpolation processing) on the image signal IMGS. The edge emphasizing module 442b may perform edge emphasizing processing on the image signal IMGS. The gamma correction module 442c may perform gamma correction (e.g., compensating) on the image signal IMGS. The white balance compensating module 442d may perform color correction processing on the image signal IMGS using the AWB evaluation value generated from the image pre-processing unit 441.

The image post-processing unit 442 may output an output image signal OIMGS as a result from the correction operations of the components included therein. The output image signal OIMGS may be transmitted to an external display device. The display device may display the output image signal OIMGS. The displayed output image signal OIMGS may include a still image or video.

Figure 10:
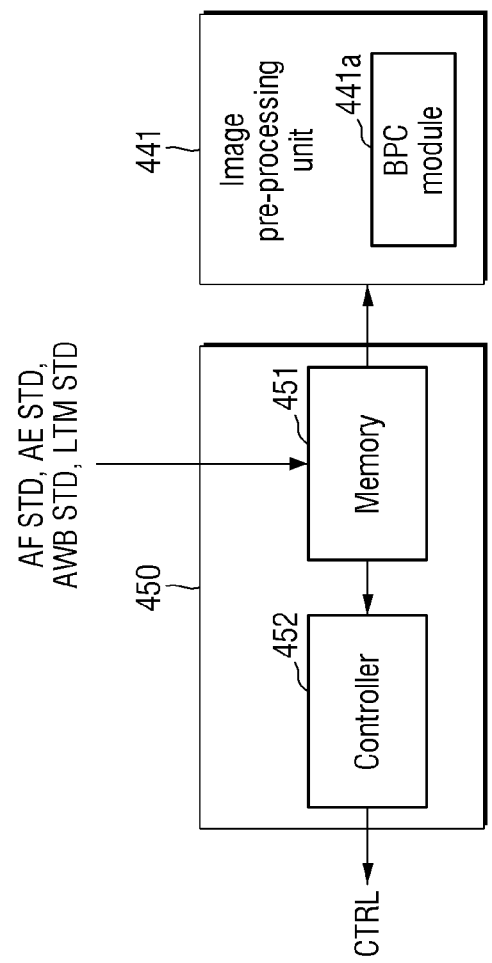
FIG. 10 is a block diagram of a DMA module and an image pre-processing module according to some embodiments.
Figure 11:
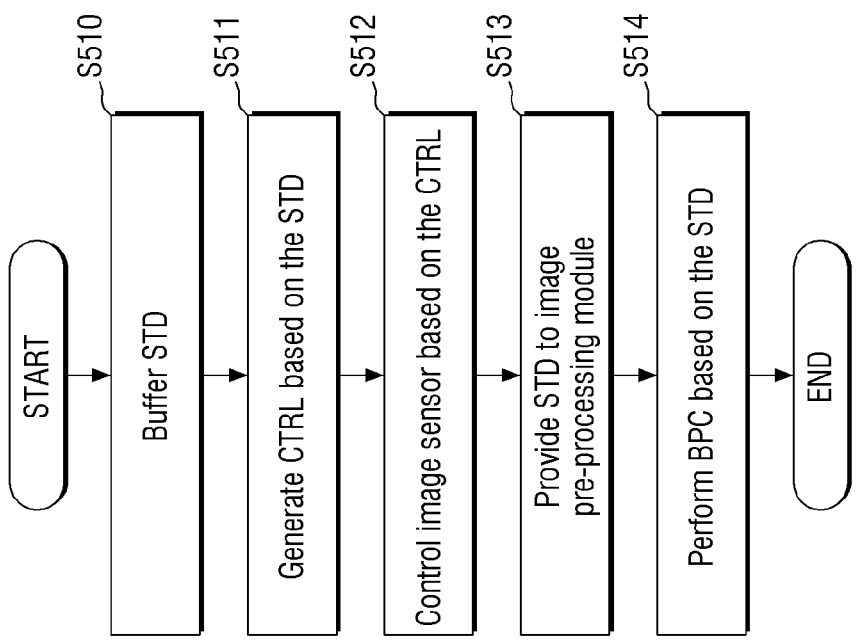
FIG. 11 is a flowchart of an operation method of the DMA module and the image pre-processing module of FIG. 10.

FIG. 10 is a block diagram of a DMA module and an image pre-processing module according to some embodiments. FIG. 11 is a flowchart of an operation method of the DMA module and the image pre-processing module of FIG. 10.

Referring to FIG. 10 and FIG. 11, the DMA module 450 may include a memory 451 and a controller 452. The DMA module 450 may be connected to all of the image sensor 100, the statistic data generating unit 410, and the image processing unit 440.

The DMA module 450 may buffer therein the statistic data STD in S510. The DMA module 450 may receive the AF statistic data AF STD, the AE statistic data AE STD, the AWB statistic data AWB STD and the LTM statistic data LTM STD from the statistic data generating unit 410 and buffer the received data in the memory 451. In this connection, the memory 451 may be a volatile memory including DRAM, SRAM, etc.

The controller 452 may control overall operations of the image signal processor 400 and an operation of the image sensor 100. For example, the controller 452 may generate the control signal CTRL based on the statistic data STD in S511. That is, the controller 452 may provide the control signal CTRL generated based on the AF statistic data AF STD, the AE statistic data AE STD, the AWB statistic data AWB STD and the LTM statistic data LTM STD to the camera module including the image sensor 100.

The camera module including the image sensor 100 may control the image sensor 100 based on the control signal CTRL in S512. That is, an operation of the image sensor 100 may be fed back based on the statistic data STD.

The DMA module 450 may provide the statistic data STD to the image pre-processing unit 441 in S513. For example, the DMA module 450 may provide the AF statistic data AF STD, the AE statistic data AE STD, the AWB statistic data AWB STD, and the LTM statistic data LTM STD stored in the memory 451 to the image pre-processing unit 441.

The image pre-processing unit 441 may perform bad pixel correction based on the statistic data STD in S514. The bad pixel correction module 441*a* may perform bad pixel correction on the image signal IMGS based on the statistic data STD. In this connection, the bad pixel correction of the image pre-processing unit 441 may be independent of the bad pixel correction of the bad pixel correction module 411 of the statistic data generating unit 410. Further, the bad pixel correction of the image pre-processing unit 441 may be performed after the bad pixel correction of the statistic data generating unit 410.

Figure 12:
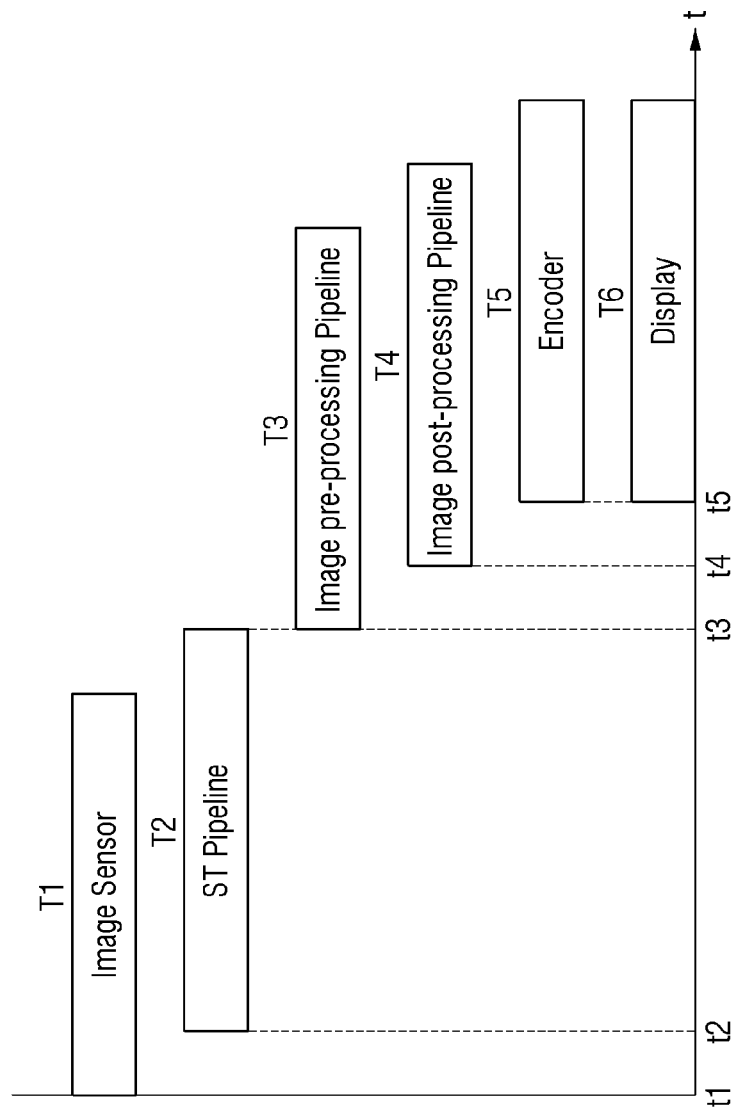
FIG. 12 to FIG. 14 are diagrams illustrating an operation over time of an image sensing device according to some embodiments.
Figure 13:
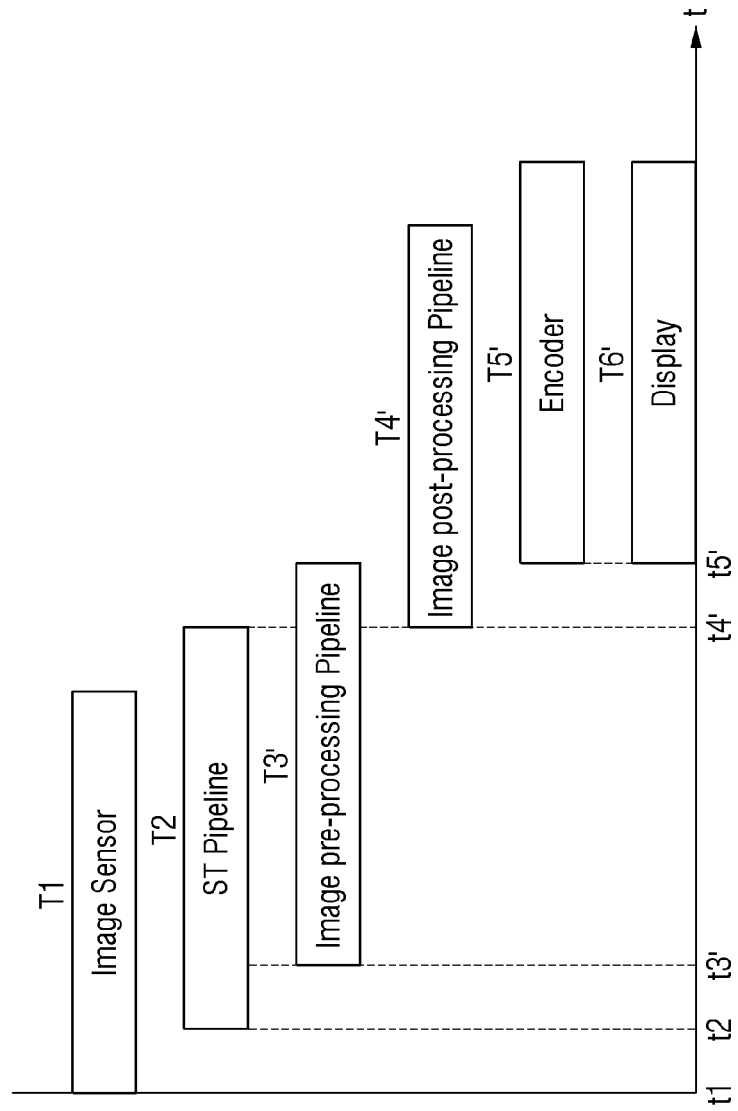
Figure 14:
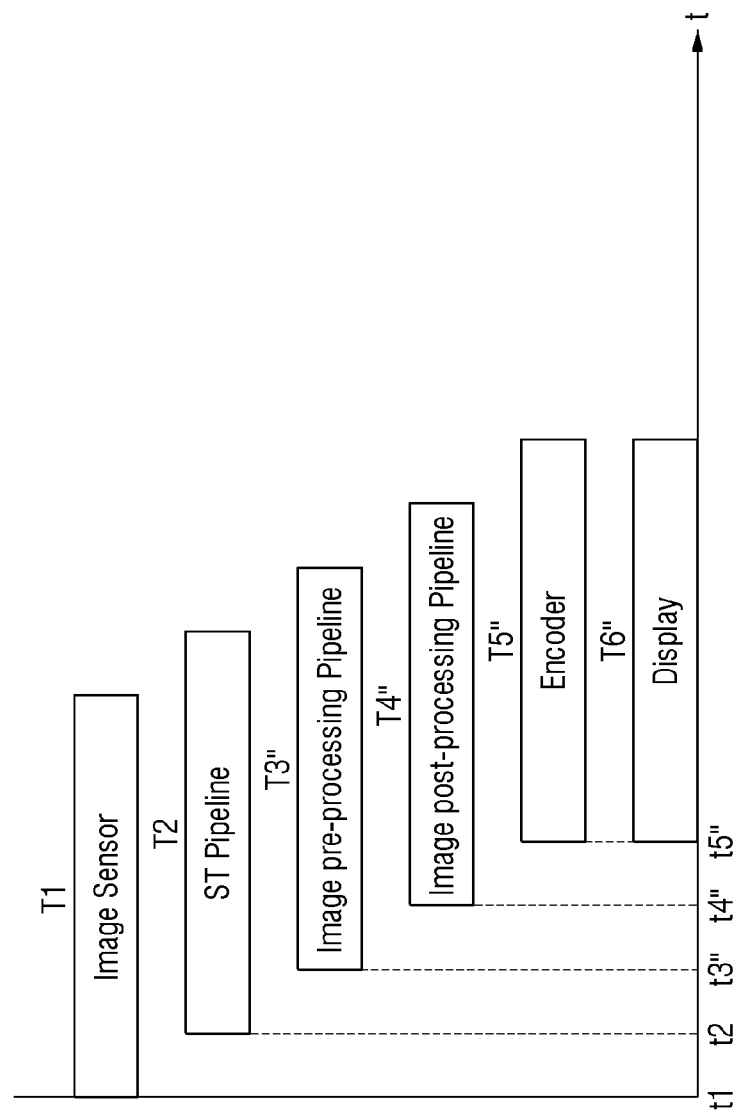

FIG. 12 to FIG. 14 are diagrams illustrating an operation over time of an image sensing device according to some embodiments.

Referring to FIG. 12, the image sensor 100 may operate for a first time period T1 since a first time t1. The image sensor 100 may output the image signal IMGS of one frame for the first time period T1. The statistic data pipeline may operate for a second time period T2 since a second time t2. That is, the statistic data generating unit 410 may generate and output the statistic data STD about the image signal IMGS of one frame for the second time period T2. In this connection, the first time period T1 and the second time period T2 may partially overlap each other.

The image pre-processing pipeline may operate for the third time period T3 since a third time t3. The image pre-processing unit 441 may perform image pre-processing on the image signal IMGS based on the statistic data STD for the third time period T3. In this connection, the third time period T3 does not overlap the first time period T1 and the second time period T2 and may be a subsequent time period thereto. Because the statistic data STD requires all the data of one frame, the statistic data STD may be output after the second time period T2 has elapsed. Accordingly, the image pre-processing unit 441 may perform image pre-processing using the generated statistic data STD.

An image post-processing pipeline may operate for a fourth time period T4 since a fourth time t4. The image post-processing unit 442 may perform image post-processing on the image signal IMSG based on the statistic data STD for the fourth time period T4. In this connection, the fourth time period T4 may partially overlap the third time period T3 and may not overlap the second time period T2. Thus, the output image signal OIMGS may be generated.

An encoder may operate for a fifth time period T5 since a fifth time t5. The display device may operate for a sixth time period T6. That is, the output image signal OIMGS may be encoded and then displayed for the fifth and sixth time periods T5 and T6.

Referring to FIG. 13, an image pre-processing pipeline may operate for a third time period T3' since a third time t3'. In this connection, the third time period T3' may partially overlap the first time period T1 and the second time period T2. In this case, the image pre-processing unit 441 may perform image pre-processing without using the statistic data STD.

The image post-processing pipeline may operate for a fourth time period T4' since a fourth time t4'. In this connection, the fourth time period T4' may not overlap the first time period T1 and the second time period T2. The image post-processing unit 442 may perform image post-processing using the statistic data STD generated for the second time period T2. Thereafter, the output image signal OIMGS may be encoded and then displayed for a fifth time period T5' and a sixth time period T6' following a fifth time t5'.

Referring to FIG. 14, the image pre-processing pipeline may operate for a third time period T3" since a third time t3". The image post-processing pipeline may operate for a fourth time period T4" since a fourth time t4". In this connection, the image signal IMGS generated for the first time period T1 and the statistic data STD generated for the second time period T2 may correspond to an image of a second frame, while the image signal IMGS on which image processing is performed for the third time period T3" and the fourth time period T4" may correspond to an image of a first frame. In this connection, the image of the second frame may be subsequent to the image of the first frame. Thereafter, the output image signal OIMGS may be encoded and then displayed for the fifth time period T5" and the sixth time period T6'" following a fifth time period t5".

Hereinafter, the statistic data generating unit 410 according to some embodiments will be described with reference to FIG. 15.

Figure 15:
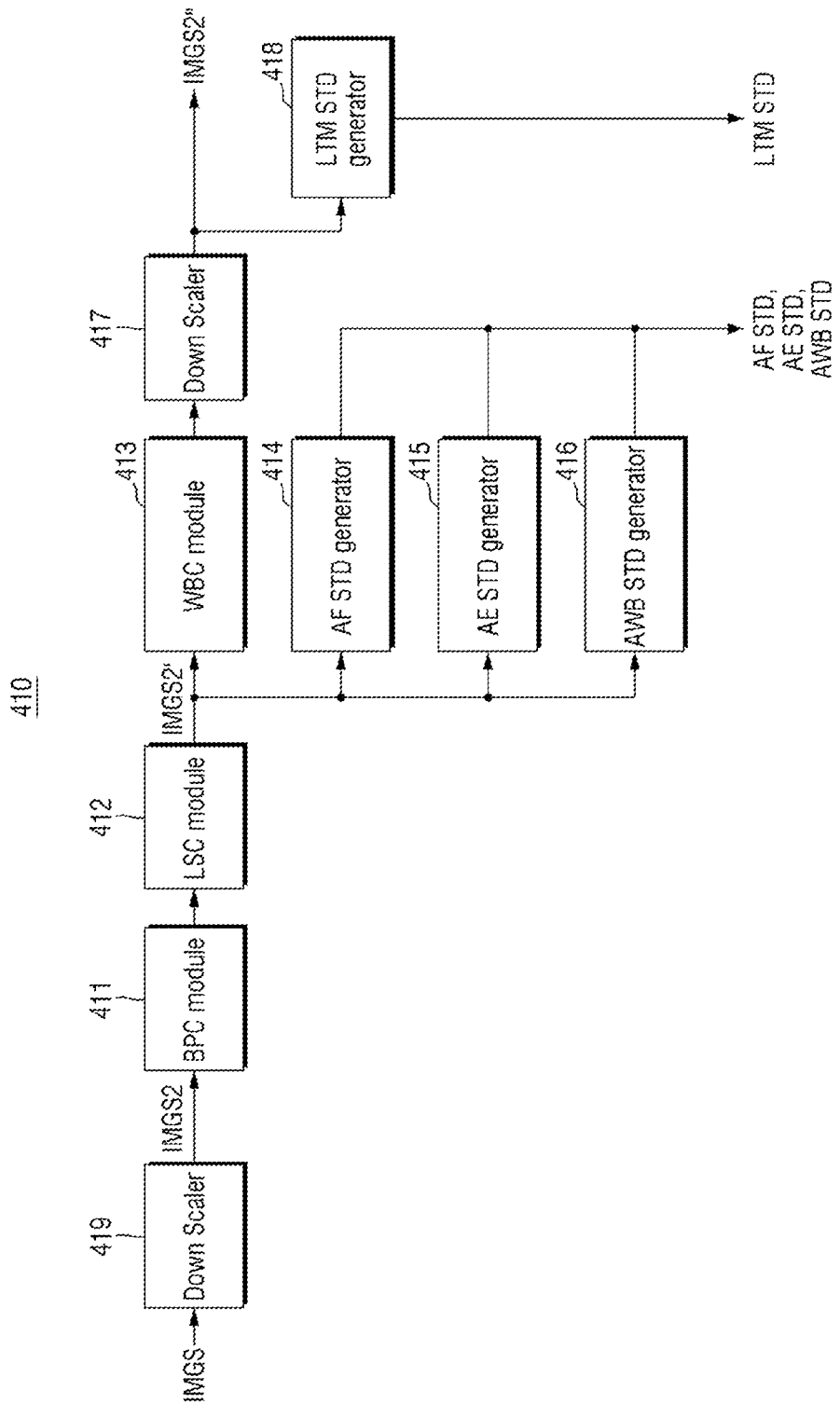
FIG. 15 is a block diagram of a statistic data generating module according to some embodiments.

FIG. 15 is a block diagram of a statistic data generating module according to some embodiments. For convenience of descriptions, components duplicate with those as described using FIG. 1 to FIG. 14 are briefly described or descriptions thereof are omitted.

Referring to FIG. 15, the statistic data generating unit 410 may include a down scaler 419. The down scaler 419 may downscale the image signal IMGS output from the image sensor 100. That is, a corrected image signal IMGS2 generated by the down scaler 419 may have a smaller data capacity than that of the image signal IMGS. That is, the statistic data generating unit 410 may generate the statistic data STD using the corrected image signal IMGS2 having the smaller data capacity. Thus, only a smaller amount of data may be processed, such that power consumption of the statistic data generating unit 410 may be reduced.

The bad pixel correction module 411 and the lens shading correction module 412 may generate a corrected image signal IMGS2' based on the corrected image signal IMGS2. The corrected image signal IMGS2' may be further downscaled by the down scaler 417. Then, the down scaler 417 may output a corrected image signal IMGS2".

Hereinafter, the image sensing device 1 according to some embodiments will be described with reference to FIG. 16 and FIG. 17A to FIG. 17C.

Figure 16:
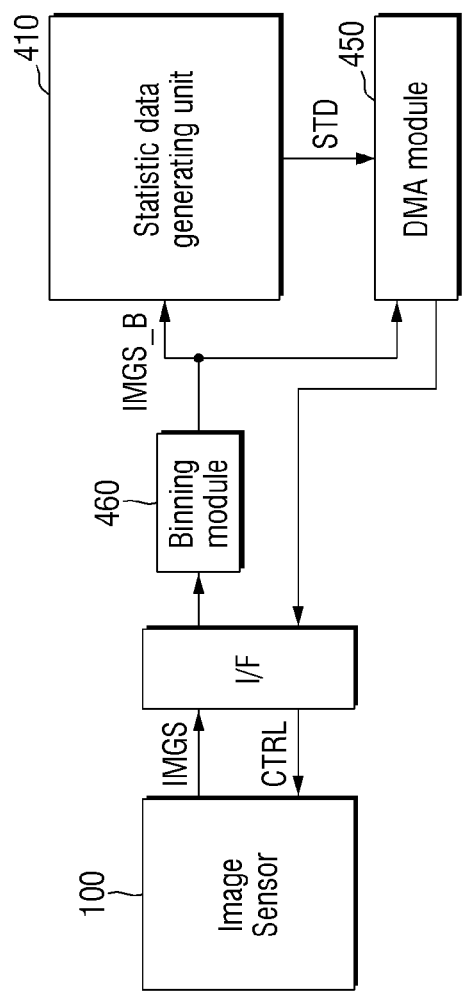
FIG. 16 is a block diagram of an image sensing device including a binning module.
Figure 17B:
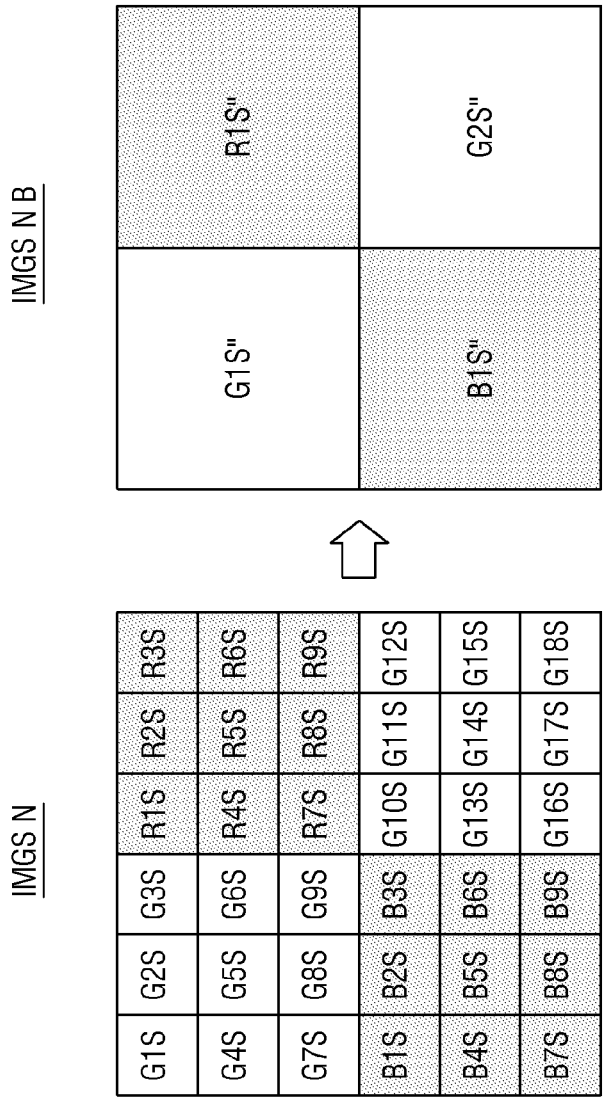
Figure 17C:
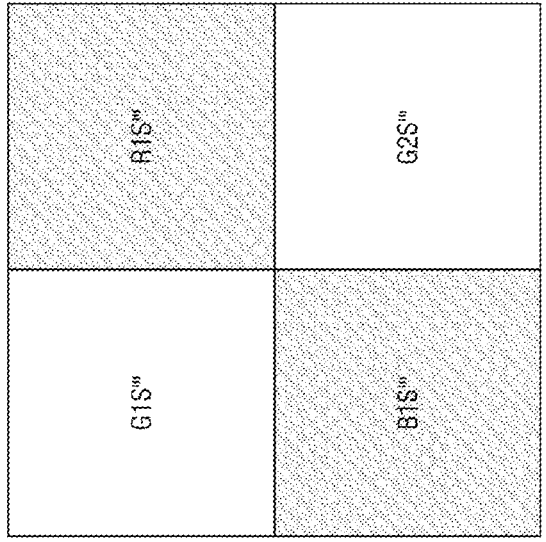

FIG. 16 is a block diagram of an image sensing device including a binning module. FIG. 17A to FIG. 17C are diagrams for illustrating an operation of the binning module in FIG. 16. For convenience of description, components duplicate with those as described using FIG. 1 to FIG. 14 are briefly described or descriptions thereof are omitted.

Referring to FIG. 16, the image signal processor 400 of the image sensing device 1 may further include a binning module 460. The binning module 460 may perform binning on the image signal IMGS output from the image sensor 100 to generate a binned image signal IMGS_B. The binned image signal IMGS_B may be transmitted to the statistic data generating unit 410 and the DMA module 450.

Referring to FIG. 17A, the image signal IMGS_T may be an image signal of a tetra pattern. For example, the pixel array PA outputting the image signal IMSG_T may have a tetra pattern. First to fourth green pixel signals G1S to G4S may constitute a first green pixel group signal. First to fourth red pixel signals R1S to R4S may constitute a first red pixel group signal. First to fourth blue pixel signals B1S to B4S may constitute a first blue pixel group signal. Fifth to eighth green pixel signals G5S to G8S may constitute a second green pixel group signal.

The binned image signal IMGS_T_B output from the binning module 460 may be an image signal of the Bayer pattern. The binned image signal IMGS_T_B may include a first green pixel signal G1S', a first red pixel signal R1S', a first blue pixel signal B1S' and a second green pixel signal G2S'. In this connection, the first green pixel signal G1S' may have an average value of the first to fourth green pixel signals G1S to G4S. The first red pixel signal R1S' may have an average value of the first to fourth red pixel signals R1S to R4S. The first blue pixel signal B1S' may have an average value of the first to fourth blue pixel signals B1S to B4S. The second green pixel signal G2S' may have an average value of the fifth to eighth green pixel signals G5S to G8S.

Thus, the binned image signal IMGS_T_B output from the binning module 460 may have a smaller data capacity than that of the image signal IMGS_T. Accordingly, the power consumed by the statistic data generating unit 410 of the image signal processor 400 may be reduced.

Referring to FIG. 17B, the image signal IMGS_N may be an image signal of a nona pattern. For example, the pixel array PA that outputs the image signal IMGS_N may have the nona pattern. First to ninth green pixel signals G1S to G9S may constitute a first green pixel group signal. First to ninth red pixel signals R1S to R9S may constitute a first red pixel group signal. First to ninth blue pixel signals B1S to B9S may constitute a first blue pixel group signal. Tenth to eighteenth green pixel signals G10S to G18S may constitute a second green pixel group signal.

The binned image signal IMGS_N_B output from the binning module 460 may be an image signal of a Bayer pattern. The binned image signal IMGS_N_B may include a first green pixel signal G1S", a first red pixel signal R1S", a first blue pixel signal B1S" and a second green pixel signal G2S". In this connection, the first green pixel signal G1S" may have an average value of first to ninth green pixel signals G1S to G9S. The first red pixel signal R1S" may have an average value of first to ninth red pixel signals R1S to R9S. The first blue pixel signal B1S" may have an average value of first to ninth blue pixel signals B1S to B9S. The second green pixel signal G2S" may have an average value of tenth to eighteenth green pixel signals G10S to G18S.

Referring to FIG. 17C, the image signal IMGS_HD may be an image signal of a hexadeca pattern. For example, the pixel array PA that outputs the image signal IMGS_HD may have a hexadeca pattern. First to sixteenth green pixel signals G1S to G16S may constitute a first green pixel group signal. First to sixteenth red pixel signals R1S to R16S may constitute a first red pixel group signal. First to the sixteenth blue pixel signals B1S to B16S may constitute a first blue pixel group signal. Seventeenth to thirty second green pixel signals G17S to G32S may constitute a second green pixel group signal.

The binned image signal IMGS_HD_B output from the binning module 460 may be an image signal of the Bayer pattern. The binned image signal IMGS_HD_B may include a first green pixel signal G1S''', a first red pixel signal R1S''', a first blue pixel signal B1S''' and a second green pixel signal G2S'''. In this connection, the first green pixel signal G1S''' may have an average value of the first to the sixteenth green pixel signals G1S to G16S. The first red pixel signal R1S''' may have an average value of the first to sixteenth red pixel signals R1S to R16S. The first blue pixel signal B1S'' may have an average value of the first to sixteenth blue pixel signals B1S to B16S. The second green pixel signal G2S" may have an average value of the seventeenth to thirty second green pixel signals G17S to G32S.

Hereinafter, an image sensing device 1b according to some embodiments will be described with reference to FIGS. 18 and 19.

Figure 18:
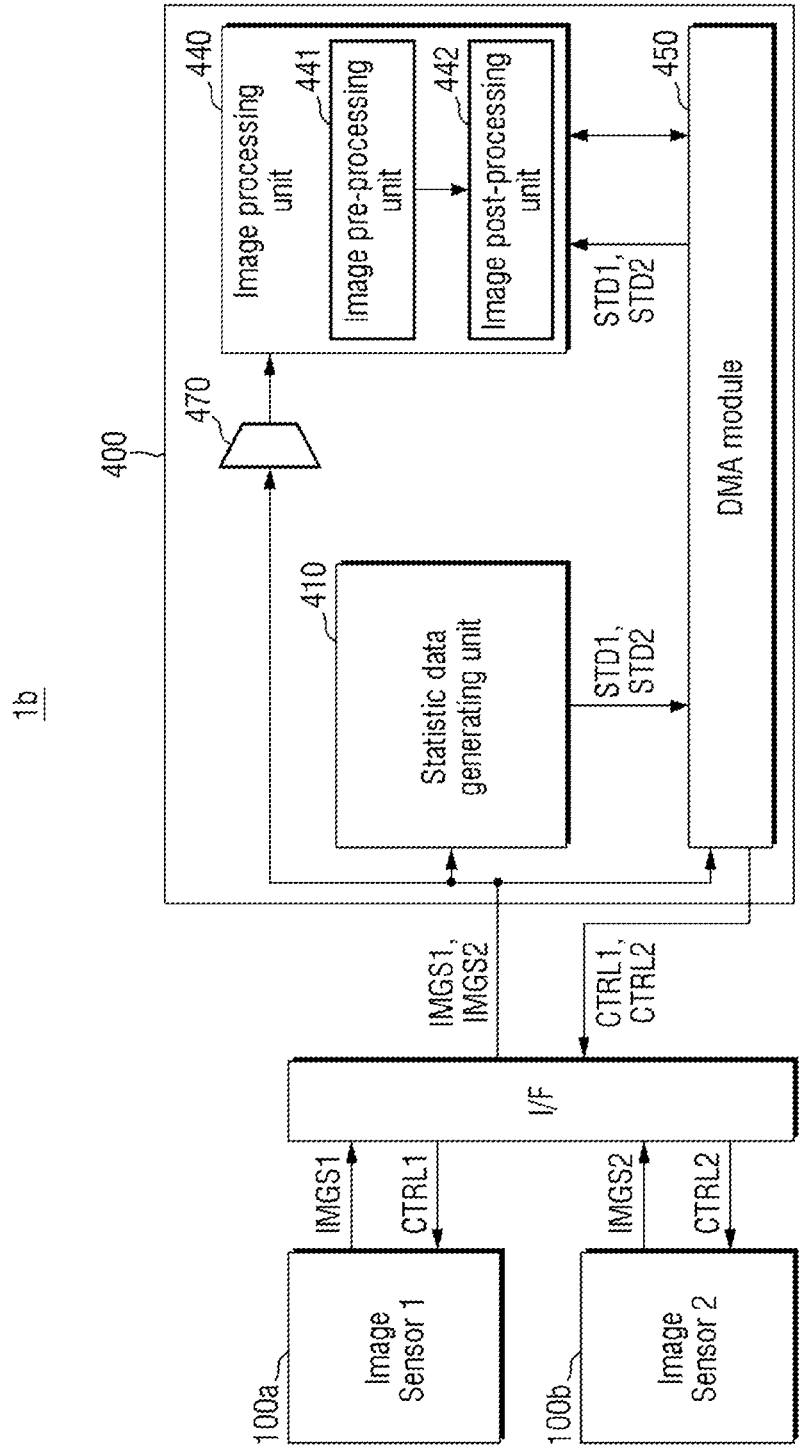
FIG. 18 is a block diagram of an image sensing device including a plurality of image sensors.

FIG. 18 is a block diagram of an image sensing device including a plurality of image sensors. FIG. 19 is a flowchart of an operation method of the image sensing device of FIG. 18. For convenience of description, components duplicate with those as described using FIG. 1 to FIG. 14 are briefly described or descriptions thereof are omitted.

Figure 19:
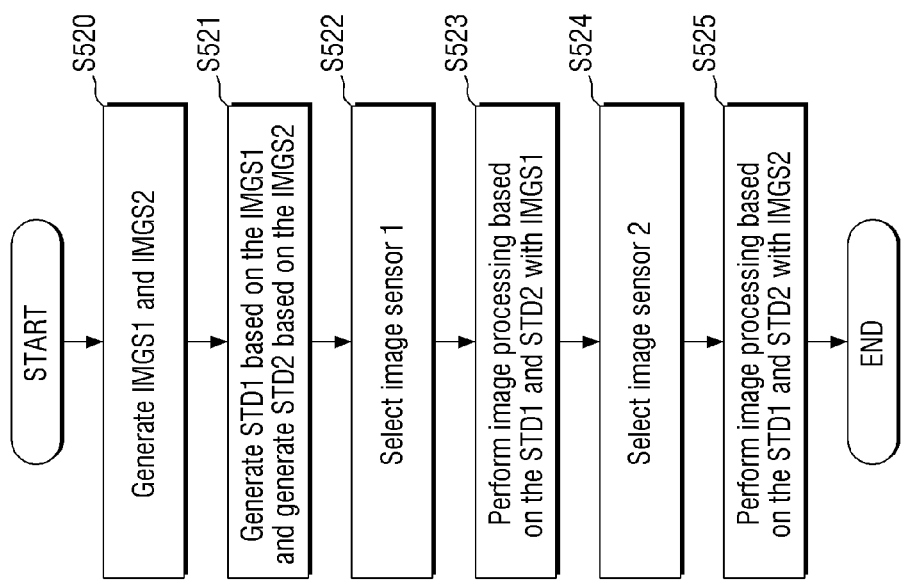
FIG. 19 is a flowchart of an operation method of the image sensing device of FIG. 18.

Referring to FIG. 18 and FIG. 19, the image sensing device 1b may include a first image sensor 100a and a second image sensor 100b. In this connection, the first image sensor 100a and the second image sensor 100b may be different, separate image sensors. A camera module in which the first image sensor 100a is disposed and a camera module in which the second image sensor 100b is disposed may be separated from each other and may operate independently. Both the first image sensor 100a and the second image sensor 100b may be connected to the image signal processor 400 via the interface device I/F.

The first image sensor 100a and the second image sensor 100b may respectively generate a first image signal IMGS1 and a second image signal IMGS2 in S520. The generated first image signal IMGS1 and the generated second image signal IMGS2 may be transmitted to the image signal processor 400. The statistic data generating unit 410 may generate first statistic data STD1 based on the first image signal IMGS1 and may generate second statistic data STD2 based on the second image signal IMGS2 in S521. That is, the statistic data generating unit 410 may generate the first and second statistic data STD1 and STD2 at the same time. Both the generated first and second statistic data STD1 and STD2 may be transferred to the DMA module 450. The DMA module 450 may generate first and second control signals CTRL1 and CTRL2 based on the first and second statistic data STD1 and STD2, respectively. The first control signal CTRL1 may be transmitted to the first image sensor 100a, while the second control signal CTRL2 may be transmitted to the second image sensor 100b. Further, the first and second statistic data STD1 and STD2 may be transmitted to the image processing unit 440 through the DMA module 450.

The image signal processor 400 may select the first image sensor 100a in S522. When the image signal processor 400 selects the first image sensor 100a, a multiplexer 470 may provide only the received first image signal IMGS1 among the received first image signal IMGS1 and the received second image signal IMGS2 to the image processing unit 440. Accordingly, the image processing unit 440 may perform image processing on the first image signal IMGS1 based on the first and second statistic data STD1 and STD2 in S523. That is, image processing on the second image signal IMGS2 may not be performed at this time.

The image signal processor 400 may select the second image sensor 100b in S524. When the image signal processor 400 selects the second image sensor 100b, the multiplexer 470 may provide only the received second image signal IMGS2 among the received first image signal IMGS1 and the received second image signal IMGS2 to the image processing unit 440. Accordingly, the image processing unit 440 may perform image processing on the second image signal IMGS2 based on the first and second statistic data STD1 and STD2 in S525. That is, image processing on the first image signal IMGS1 may not be performed at this time.

While image processing on one of the first image signal IMGS1 and the second image signal IMGS1 is being performed, the first and second statistic data STD1 and STD2 may be continuously generated. Because the statistic data generating unit 410 does not perform the image processing and generates only the statistic data STD, the power consumption of the image signal processor 400 may be further reduced. Further, when the camera module has been switched, image processing on one of the first and second image signals IMGS1 and IMGS2 as selected by the multiplexer 470 may be quickly performed only because both the first and second statistic data STD1 and STD2 are being generated.

Hereinafter, with reference to FIG. 20 to FIG. 22, electronic devices 600, 600', and 600" according to some further embodiments will be described.

Figure 20:
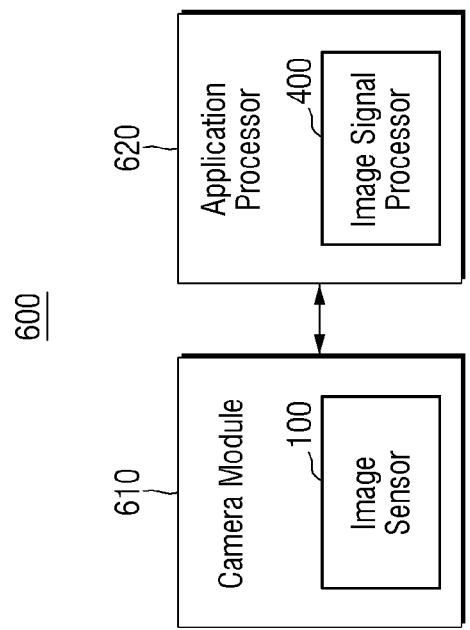
FIG. 20 is a diagram of an electronic device according to some embodiments.

FIG. 20 is a diagram of an electronic device according to some embodiments. FIG. 21 is a diagram of an electronic device according to some embodiments. FIG. 22 is a diagram of an electronic device according to some embodiments. For convenience of description, components duplicate with those as described using FIG. 1 to FIG. 14 are briefly described or descriptions thereof are omitted.

Referring to FIG. 20, the electronic device 600 may include a camera module 610 and an application processor 620. The application processor 620 may process and display an image signal output from the camera module 610 and may control the camera module 610.

The camera module 610 may include the image sensor 100. The application processor 620 may include the image signal processor 400. The image sensor 100 may be disposed in the camera module 610. The image sensor 100 may generate the image signal IMGS and provide the image signal to the application processor 620.

The image signal processor 400 may be disposed in the application processor 620. The image signal processor 400 may generate the statistic data STD based on the image signal IMGS received from the camera module 610 and perform image processing on the image signal IMGS. That is, the application processor 620 may perform both statistic data STD generation and image processing.

Figure 21:
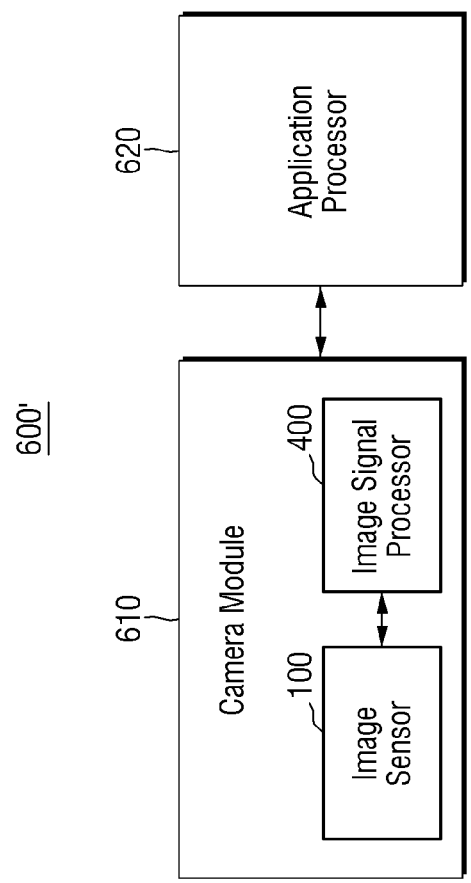
FIG. 21 is a diagram of an electronic device according to some embodiments.

Referring to FIG. 21, the electronic device 600' may include the camera module 610 and the application processor 620. The camera module 610 may include both the image sensor 100 and the image signal processor 400. That is, both the image sensor 100 and the image signal processor 400 may be disposed in the camera module 610.

The image signal processor 400 may generate statistic data STD based on the image signal IMGS output from the image sensor 100 and perform image processing on the image signal IMGS using the statistic data STD. That is, the camera module 610 may perform both statistic data STD generation and image processing.

Figure 22:
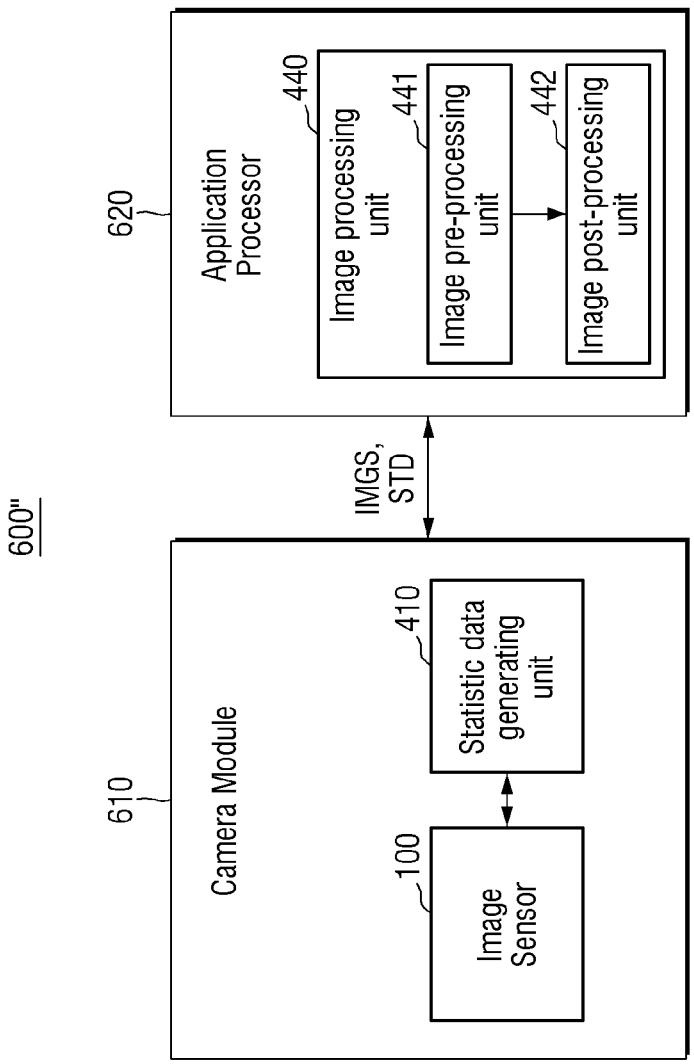
FIG. 22 is a diagram of an electronic device according to some embodiments.

Referring to FIG. 22, the electronic device 600" may include the camera module 610 and the application processor 620. The camera module 610 may include the image sensor 100 and the statistic data generating unit 410. The application processor 620 may include the image processing unit 440. That is, the statistic data generating unit 410 and the image processing unit 440 may be disposed in different components.

The statistic data generating unit 410 included in the camera module 610 may generate the statistic data STD based on the image signal IMGS. The camera module 610 may provide the image signal IMGS and the statistic data STD to the application processor 620. The image processing unit 440 included in the application processor 620 may perform image processing on the image signal IMGS based on the statistic data STD. That is, the camera module 610 may generate the statistic data STD, while the application processor 620 may perform image processing on the image signal IMGS.

Hereinafter, an image sensor 100" according to some further embodiments will be described with reference to FIG. 23.

Figure 23:
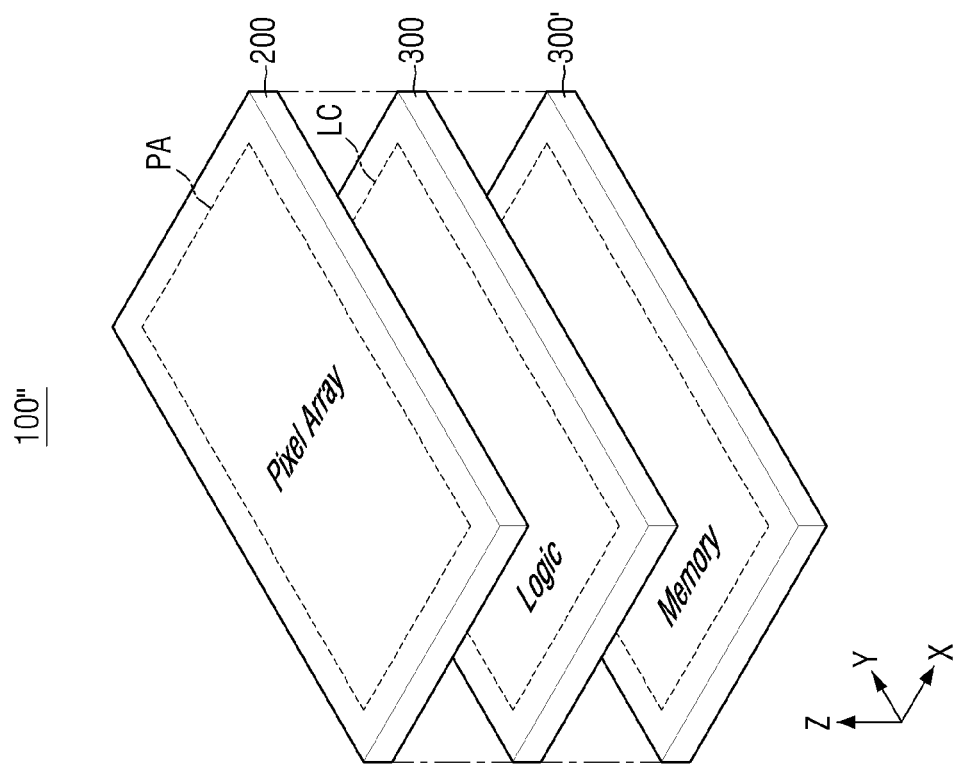
FIG. 23 is a diagram illustrating a conceptual layout of an image sensor according to some embodiments.

FIG. 23 is a diagram illustrating a conceptual layout of an image sensor according to some embodiments. For convenience of description, components duplicate with those as described using FIG. 1 to FIG. 22 are briefly described or descriptions thereof are omitted.

Referring to FIG. 23, the image sensor 100" may include an upper chip 200, a lower chip 300, and a memory chip 300'. In this connection, the upper chip 200, the lower chip 300 and the memory chip 300' may be stacked sequentially along a third direction Z. The memory chip 300' may be disposed under the lower chip 300. The memory chip 300' may include a memory device. For example, the memory chip 300' may include a volatile memory device such as DRAM and SRAM. The memory chip 300' may receive a signal from the upper chip 200 and the lower chip 300 and process the signal using the memory device. That is, the image sensor 100" including the memory chip 300' may be embodied as a three-layer stack image sensor.

Hereinafter, an electronic device 2000 according to some further embodiments will be described with reference to FIG. 24 and FIG. 25.

Figure 24:
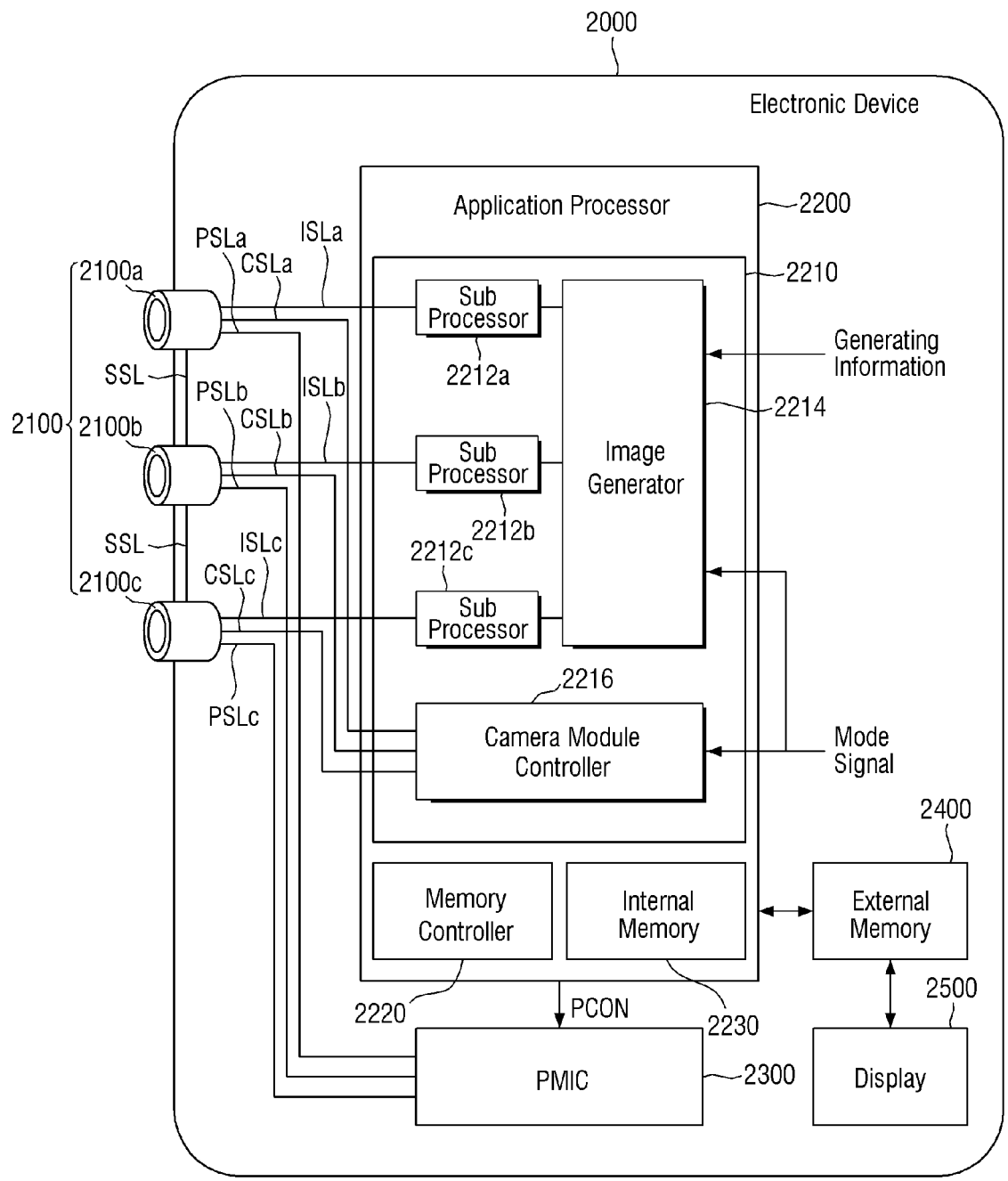
FIG. 24 is a block diagram for illustrating an electronic device including a multi-camera module according to some embodiments.

FIG. 24 is a block diagram for illustrating an electronic device including a multi-camera module according to some embodiments. FIG. 25 is a detailed block diagram of the camera module of FIG. 24. For convenience of description, components duplicate with those as described using FIG. 1 to FIG. 23 are briefly described or descriptions thereof are omitted.

Referring to FIG. 24, the electronic device 2000 may include a camera module group 2100, an application processor 2200, a power management integrated circuit (PMIC) 2300, an external memory 2400 and a display 2500.

The camera module group 2100 may include a plurality of camera modules 2100a, 2100b, and 2100c. Although the drawing shows an embodiment in which the three camera modules 2100a, 2100b, and 2100c are arranged, embodiments are not limited thereto. In some embodiments, the camera module group 2100 may be modified to include only two camera modules. Further, in some embodiments, the camera module group 2100 may be modified to include n camera modules (n is a natural number of 4 or greater).

In this connection, each of the three camera modules 2100a, 2100b, and 2100c may be a camera module including the image sensors 100a and 100b as described with reference to FIG. 18.

Hereinafter, with reference to FIG. 25, a detailed configuration of the camera module 2100b will be described in more detail. However, following descriptions may be equally applied to other camera modules 2100a and 2100c according to an embodiment.

Figure 25:
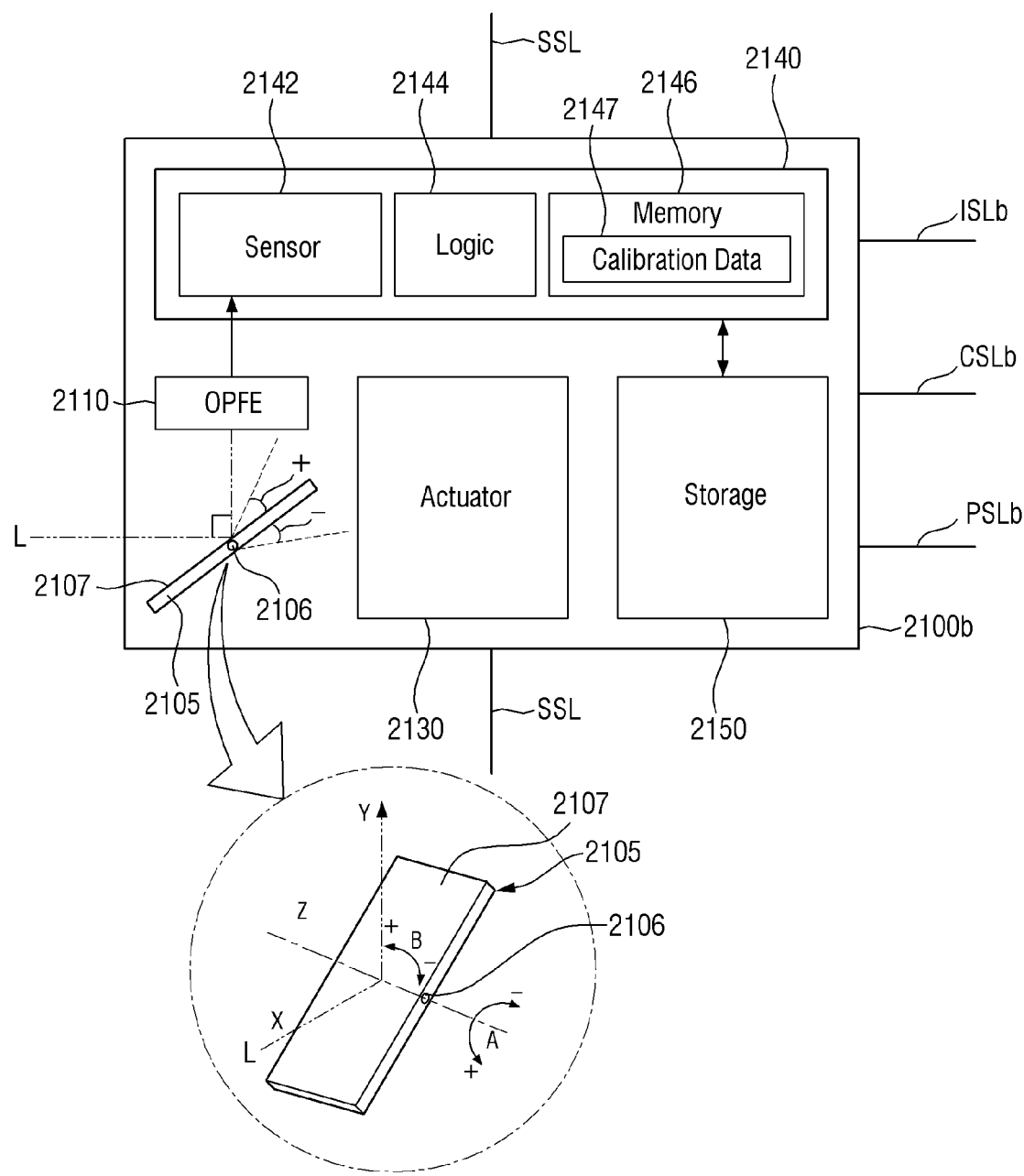
FIG. 25 is a detailed block diagram of the camera module of FIG. 24.

Referring to FIG. 25, the camera module 2100b may include a prism 2105, an optical path folding element (hereinafter, "OPFE") 2110, an actuator 2130, an image sensing device 2140, and storage 2150.

The prism 2105 may include a reflective face 2107 made of a reflective material and, thus, may modify a path of light L incident from outside.

In some embodiments, the prism 2105 may change the path of the light L such that the light incident thereto in the first direction X is output therefrom in a second direction Y perpendicular to the first direction X. Further, the prism 2105 may rotate the reflective face 2107 of the reflective material in an A direction about a central axis 2106 or may rotate the central axis 2106 in a B direction so that the light incident thereto in the first direction X is output therefrom in the second direction Y perpendicular to the first direction X. In this connection, the OPFE 2110 may move a third direction Z normal to a plane defined by the first direction X and the second direction Y.

In some embodiments, as shown, a maximum rotation angle in the A direction of the prism 2105 may be smaller than or equal to 15 degrees in a plus (+) A direction and may be greater than 15 degrees in a minus (−) A direction. However, embodiments of the present disclosure are not limited thereto.

In some embodiments, the prism 2105 may move by a range around 20 degrees, or between 10 and 20 degrees, or between 15 and 20 degrees in the plus (+) or minus (−) B direction. In this connection, the prism 2105 may move by the same angle in the plus (+) and minus (−) B directions. Alternatively, angles by which the prism 2105 may move in the plus (+) and minus (−) B directions, respectively, may have a difference of about 1 degree therebetween.

In some embodiments, the prism 2105 may move the reflective face 2107 made of the light reflective material in the third direction, for example, the Z direction parallel to an extension direction of the center axis 2106.

The OPFE 2110 may include a group of m optical lens (m being a natural number). The group of m optical lenses may move in the second direction Y to change an optical zoom ratio of the camera module 2100b. For example, a basic optical zoom ratio of the camera module 2100b may be Z. When the m optical lenses included in the OPFE 2110 move, the optical zoom ratio of the camera module 2100b may be changed to an optical zoom ratio equal to or higher than 3Z or 5Z.

The actuator 2130 may move the OPFE 2110 or the optical lens to a specific position. For example, the actuator 2130 may adjust a position of the optical lens so that the image sensor 2142 is located at a focal length of the optical lens for accurate sensing.

The image sensing device 2140 may include an image sensor 2142, a control logic 2144 and a memory 2146. The image sensor 2142 may sense an image of a sensing target using the light L provided through the optical lens. In some embodiments, the image sensor 2142 may include the image sensor 100, 100a, or 100b as described above. The image sensor 2142 may output the image signal IMGS.

The control logic 2144 may control all the operations of the camera module 2100b. For example, the control logic 2144 may control an operation of the camera module 2100b based on a control signal provided through a control signal line CSLb.

The memory 2146 may store therein information necessary for the operation of the camera module 2100b, such as calibration data 2147. The calibration data 2147 may include information required when the camera module 2100b generates image data using the light L provided from the outside. The calibration data 2147 may include, for example, information about a degree of rotation, information about a focal length, information about an optical axis, and the like, as described above. When the camera module 2100b is implemented in a multi-state camera form in which the focal length varies based on a position of the optical lens, the calibration data 2147 may include a focal length value based on each position (or each state) of the optical lens and information related to auto focusing.

The storage 2150 may store therein image data sensed via the image sensor 2142. The storage 2150 may be disposed outside the image sensing device 2140 and may be implemented to be stacked on a sensor chip constituting the image sensing device 2140. In some embodiments, the storage 2150 may be embodied as an EEPROM (Electrically Erasable Programmable Read-Only Memory). However, embodiments of the present disclosure are not limited thereto.

Referring to FIG. 24 and FIG. 25 together, in some embodiments each of the plurality of camera modules 2100a, 2100b, and 2100c may include each actuator 2130. Accordingly, each of the plurality of camera modules 2100a, 2100b, and 2100c may include the same or different calibration data 2147 based on an operation of the actuator 2130 included therein.

In some embodiments, one camera module (e.g., 2100b) among the plurality of camera modules 2100a, 2100b, and 2100c may be a camera module in a folded lens form including the prism 2105 and the OPFE 2110 as described above, while each of the remaining camera modules (e.g., 2100a and 2100c) may be a vertical-type camera module that does not include the prism 2105 and the OPFE 2110. However, embodiments are not limited thereto.

In an implementation, one camera module (e.g., 2100c) among the plurality of camera modules 2100a, 2100b, and 2100c, may be a depth camera of a vertical form that extracts depth information, for example, using IR (Infrared Ray). In this case, the application processor 1200 may merge image data provided from the depth camera and image data provided from another camera module (e.g., 2100a or 2100b) to generate a three-dimensional depth image (3D depth image).

In some embodiments, at least two (e.g., 2100a and 2100b) of the plurality of camera modules 2100a, 2100b, and 2100c may have different FOVs (Field of Views). In this case, for example, optical lenses of at least two (e.g., 2100a and 2100b) of the plurality of camera modules 2100a, 2100b, and 2100c may be different from each other. However, the present disclosure is not limited thereto.

Further, in an implementation, FOVs of the plurality of camera modules 2100a, 2100b, and 2100c may be different from each other. In this case, the optical lenses respectively included in the plurality of camera modules 2100a, 2100b, and 2100c may also be different from each other. However, the present disclosure is not limited thereto.

In some embodiments, the plurality of camera modules 2100a, 2100b, and 2100c may be physically separated from each other. That is, instead of a scheme in which a sensing area of one image sensor 2142 is divided into a plurality of sub-areas which correspond to the plurality of camera modules 2100a, 2100b, and 2100c, a scheme in which an individual image sensor 2142 may be disposed in each of the plurality of camera modules 2100a, 2100b, and 2100c may be employed.

Referring back to FIG. 24, the application processor 2200 may include an image processing device 2210, a memory controller 2220, and an internal memory 2230. The application processor 2200 may be implemented to be separated from the plurality of camera modules 2100a, 2100b, and 2100c. For example, the application processor 2200 and the plurality of camera modules 2100a, 2100b, and 2100c may be implemented as separate semiconductor chips that are separated from each other.

The image processing device 2210 may include a plurality of sub-image processors 2212a, 2212b and 2212c, an image generator 2214 and a camera module controller 2216.

The number of the sub-image processors 2212a, 2212b, and 2212c may correspond to the number of camera modules 2100a, 2100b, and 2100c.

Image data generated from each of the camera modules 2100a, 2100b, and 2100c may be provided to each of the sub-image processors 2212a, 2212b, and 2212c via each of image signal lines ISLa, ISLb, and ISLc, which are separated from each other. For example, the image data generated from the camera module 2100a may be transmitted to the sub-image processor 2212a via the image signal line ISLa. The image data generated from the camera module 2100b may be transmitted to the sub-image processor 2212b via the image signal line ISLb. The image data generated from the camera module 2100c may be transmitted to the sub-image processor 2212c via the image signal line ISLc. The image data transmission may be performed, for example, using a camera serial interface (CSI) based on an MIPI (Mobile Industry Processor Interface). However, embodiments of the present disclosure are not limited thereto.

In one example, one sub-image processor may correspond to a plurality of camera modules. For example, the sub-image processor 2212a and the sub-image processor 2212c may not be implemented separately from each other as shown but may be integrated into one sub-image processor. The image data provided from the camera module 2100a and the camera module 2100c may be selected via a selection element, for example, a multiplexer and then may be provided to the integrated sub-image processor.

The image data provided to each of the sub-image processors 2212a, 2212b, and 2212c may be provided to the image generator 2214. The image generator 2214 may generate an output image using the image data provided from each of the sub-image processors 2212a, 2212b, and 2212c and based on image generation information or a mode signal.

Specifically, the image generator 2214 may merge at least a portion of the image data generated from the camera modules 2100a, 2100b, and 2100c having different FOVs and based on the image generation information or the mode signal and, thus, may generate the output image as the merging result. Further, the image generator 2214 may select one of the image data generated from the camera modules 2100a, 2100b, and 2100c having different FOVs and based on the image generation information or the mode signal and, thus, may generate the output image as the selected data.

In some embodiments, the image generation information may include a zoom signal or a zoom factor. Further, in some embodiments, the mode signal may be, for example, a signal based on a mode selected by a user.

When the image generation information is the zoom signal or the zoom factor and the camera modules 2100a, 2100b, and 2100c have different FOVs, the image generator 2214 may perform different operations based on types of the zoom signal. For example, when the zoom signal is a first signal, the image generator may merge the image data output from the camera module 2100a and the image data output from the camera module 2100c with each other and generate the output image using the merged image data; and the image data output from the camera module 2100b is not used in the merging operation. When the zoom signal is a second signal different from the first signal, the image generator 2214 may not perform such an image data merging operation but may select one of the image data output from the camera modules 2100a, 2100b, and 2100c and may generate the selected data as the output image. However, embodiments are not limited thereto. A scheme for processing the image data may be modified as needed.

In some embodiments, the image generator 2214 may receive a plurality of image data having different exposure times from at least one of the plurality of sub-image processors 2212a, 2212b, and 2212c and may perform HDR (high dynamic range) processing on the received plurality of image data, thereby generating merged image data having an increased dynamic range.

The camera module controller 2216 may provide a control signal to each of the camera modules 2100a, 2100b, and 2100c. The control signal generated from the camera module controller 2216 may be provided to a corresponding one of the camera modules 2100a, 2100b, and 2100c via a corresponding one of the control signal lines CSLa, CSLb and CSLc, which are separated from each other.

One of the plurality of camera modules 2100a, 2100b, and 2100c may be designated as a master camera (e.g., 2100b) based on the image generation information including the zoom signal or the mode signal, while each of the remaining camera modules (e.g., 2100a and 2100c) may be designated as a slave camera. This designation information may be included in the control signal and may be provided to a corresponding one of the camera modules 2100a, 2100b, and 2100c via a corresponding one of the control signal lines CSLa, CSLb and CSLc, which are separated from each other.

The camera module acting as the master or slave camera may vary based on the zoom factor or an operation mode signal. For example, when the FOV of the camera module 2100a is larger than that of the camera module 2100c and the zoom factor indicates a low zoom ratio, the camera module 2100c may act as a master camera, while the camera module 2100a may act as a slave camera. Conversely, when the zoom factor indicates a high zoom ratio, the camera module 2100a may act as a master camera while the camera module 2100c may act as a slave camera.

In some embodiments, the control signal from the camera module controller 2216 provided to each of the camera modules 2100a, 2100b, and 2100c may include a sync enable signal. For example, when the camera module 2100b is the master camera and each of the camera modules 2100a and 2100c is the slave camera, the camera module controller 2216 may transmit the sync enable signal to the camera module 2100b. Upon receiving such a sync enable signal, the camera module 2100b may generate a sync signal based on the provided sync enable signal and may provide the generated sync signal to the camera modules 2100a and 2100c via a sync signal line SSL. The camera module 2100b and the camera modules 2100a and 2100c may transmit the image data to the application processor 2200 while the camera module 2100b and the camera modules 2100a and 2100c are synchronized with each other using the sync signal.

In some embodiments, the control signal from the camera module controller 2216 provided to each of the plurality of camera modules 2100a, 2100b, and 2100c may include mode information according to the mode signal. Based on this mode information, the plurality of camera modules 2100a, 2100b, and 2100c may operate in a first operation mode or a second operation mode in relation to a sensing speed.

In a first operation mode, the plurality of camera modules 2100a, 2100b, and 2100c may generate an image signal at a first speed (for example, may generate an image signal at a first frame rate), may encode the image signal at a second speed higher than the first speed (for example, encode the image signal at a second frame rate higher than the first frame rate) and may transmit the encoded image signal to the application processor 2200. In this connection, the second speed may be lower than or equal to 30 times the first speed.

The application processor 2200 may store the received image signal, that is, the encoded image signal, in the memory 2230 provided therein or storage 2400 external to the application processor 2200, then read and decode the encoded image signal from the memory 2230 or the storage 2400, and then display image data generated based on the decoded image signal. For example, a corresponding auxiliary processor among the plurality of auxiliary processors 2212a, 2212b, and 2212c of the image processing device 2210 may perform the decoding and may perform the image processing on the decoded image signal. For example, image data generated based on the decoded image signal may be displayed on the display 2500.

In a second operation mode, the plurality of camera modules 2100a, 2100b, and 2100c may generate an image signal at a third speed lower than the first speed (for example, generate an image signal at a third frame rate lower than the first frame rate) and then transmit the image signal to the application processor 2200. The image signal provided to the application processor 2200 may be an unencoded signal. The application processor 2200 may perform image processing on the received image signal or may store the image signal in the memory 2230 or the storage 2400.

The PMIC 2300 may supply power, for example, a power supply voltage to each of the plurality of camera modules 2100a, 2100b, and 2100c. For example, the PMIC 2300 may supply first power to the camera module 2100a through a first power signal line PSLa, supply second power to the camera module 2100b through a second power signal line PSLb, and supply third power to the camera module 2100c through a third power signal line PSLc under control of the application processor 2200.

The PMIC 2300 may generate power corresponding to each of the plurality of camera modules 2100a, 2100b, and 2100c and adjust a power level in response to a power control signal PCON from the application processor 2200. The power control signal PCON may include an operation mode-based power adjustment signal for the plurality of camera modules 2100a, 2100b, and 2100c. For example, the operation mode may include a low power mode. In this connection, the power control signal PCON may include information about a camera module operating in the low power mode and information about a set power level. Levels of power respectively provided to the plurality of camera modules 2100a, 2100b, and 2100c may be the same as or different from each other. Further, the level of the power may vary dynamically.

Hereinafter, a vehicle 700 including electronic control units 710 and an acquisition device (e.g., detector) 730 according to another embodiment will be described with reference to FIG. 26.

Figure 26:
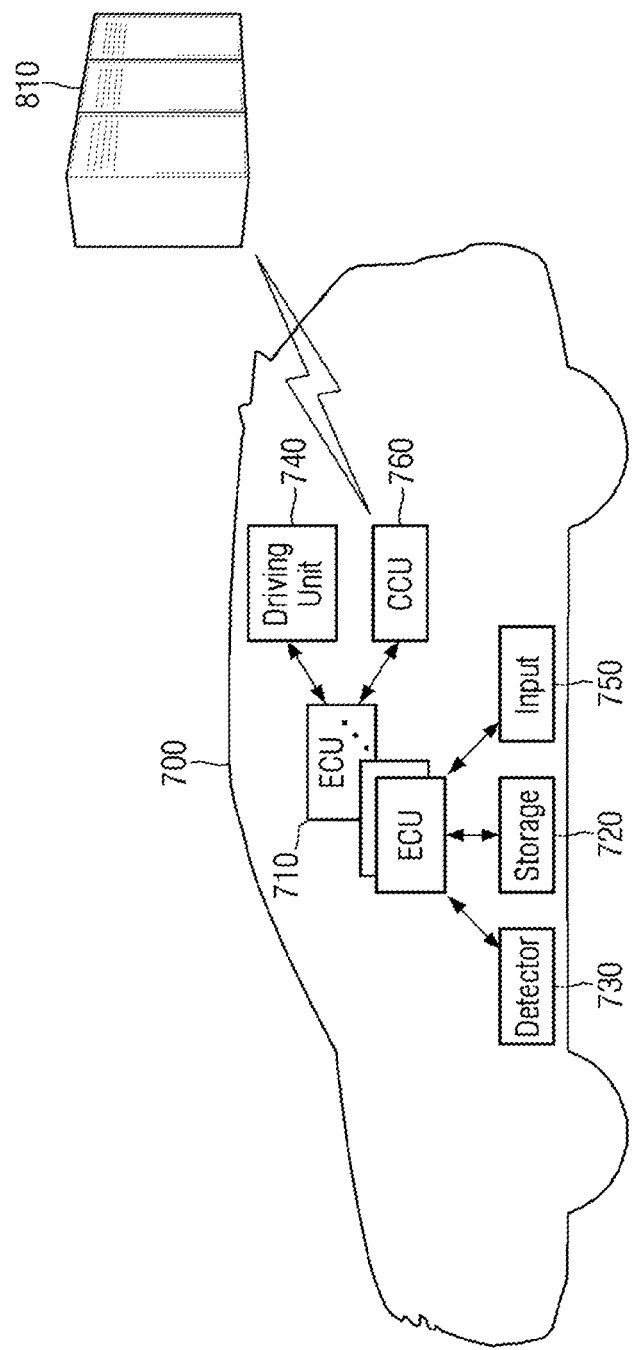
FIG. 26 is a diagram of a vehicle including a camera module according to some embodiments.

FIG. 26 is a diagram of a vehicle including a camera module according to some embodiments. For convenience of description, components duplicate with those as described using FIG. 1 to FIG. 23 are briefly described or descriptions thereof are omitted.

Referring to FIG. 26, the vehicle 700 may include a plurality of electronic control units (ECUs) 710, and a storage device 720.

Each of the plurality of electronic control units 710 may be electrically, mechanically, and communicatively connected to at least one device among a plurality of devices provided in the vehicle 700 and may control an operation of the at least one device based on one function execution command.

In this connection, the plurality of devices may include the acquisition device 730 that acquires information required to perform at least one function and a driving unit 740 that performs at least one function.

For example, the acquisition device 730 may include various detectors and image acquisition devices. The driving unit 740 may include a fan and a compressor of an air conditioning device, a fan of a ventilation device, an engine and a motor of a power device, a motor of a steering device, a motor and a valve of a braking device, and an opening/closing device of a door or a tail gate. In this connection, the acquisition device 730 may include the image sensor 100 or the image sensing device 1 as described above with reference to FIG. 1 to FIG. 23. Further, the acquisition device 730 may include a plurality of image sensors 100a and 100b.

The plurality of electronic control units 710 may communicate with the acquisition device 730 and the driving unit 740 using, for example, at least one of Ethernet, low voltage differential signal (LVDS) communication, and LIN (Local Interconnect Network) communication.

The plurality of electronic control units 710 determines whether it is necessary to perform a function, based on information obtained through the acquisition device 730 and then controls an operation of the driving unit 740 that performs the function when it is determined that it is necessary to perform the function. In this connection, the plurality of electronic control units 710 may control an operation amount based on the obtained information. In this connection, the plurality of electronic control units 710 may store the acquired image in the storage 720 or read information stored in the storage 720 and use the read information.

The plurality of electronic control units 710 may control an operation of the driving unit 740 that performs the function based on the function execution command input through an input unit 750. The plurality of electronic control units 710 may identify a set amount corresponding to information input through the input unit 750 and may control the operation of the driving unit 740 which performs the function based on the identified set amount Each electronic control unit 710 may independently control one function or may control one function in conjunction with another electronic control unit.

For example, an electronic control unit for a collision avoidance device may output a warning sound about a collision with an obstacle through a speaker when a distance of the vehicle to the obstacle as detected using a distance detector is within a reference distance.

An electronic control unit for an autonomous driving control device may be associated with an electronic control unit for a vehicle terminal, an electronic control unit for an image acquisition device and an electronic control unit for the collision avoidance device, may receive navigation information, road image information, and distance information to the obstacles, and may control the power device, the braking device, and the steering device based on the received information for autonomous driving.

A connectivity control unit (CCU) 760 may be electrically, mechanically and communicatively connected to each of the plurality of electronic control units 710 and may communicate with each of the plurality of electronic control units 710.

That is, the connectivity control device 760 may communicate directly with the plurality of electronic control units 710 provided inside the vehicle, may communicate with an external server, and may communicate with an external terminal via an interface.

In this connection, the connectivity control device 760 may communicate with the plurality of electronic control units 710 and may communicate with a server 810 using an antenna (not shown) and RF communication.

Further, the connectivity control device 760 may communicate with the server 810 through wireless communication. In this connection, the wireless communication between the connectivity control device 760 and the server 810 may include various wireless communication schemes such as Wifi, wireless broadband, GSM (global System for Mobile Communication), CDMA (Code Division Multiple Access), WCDMA (Wideband Code Division Multiple Access), UMTS (universal mobile telecommunications system), TDMA (Time Division Multiple Access), LTE (Long Term Evolution), etc.

Hereinafter, a mobile electronic device 3000 according to another embodiment will be described with reference to FIG. 27 and FIG. 28.

Figure 27:
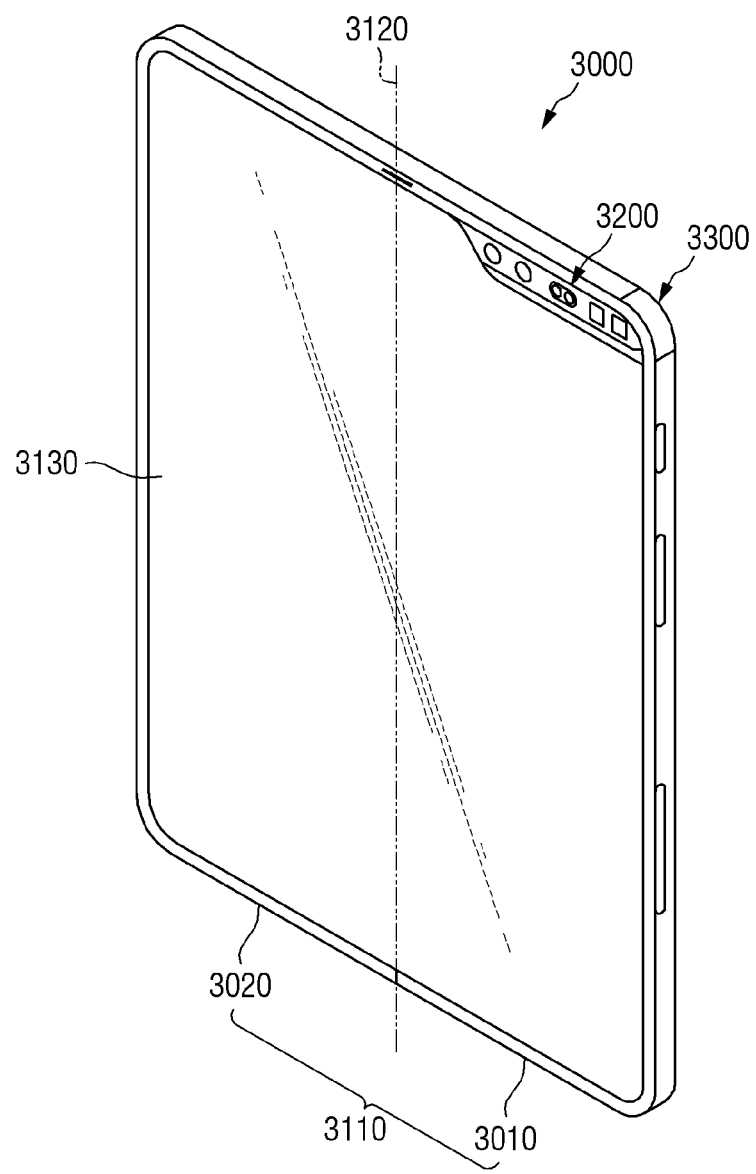
FIG. 27 is a diagram of a mobile electronic device including a plurality of camera modules according to some embodiments.

FIG. 27 is a diagram of a mobile electronic device including a plurality of camera modules according to some embodiments. FIG. 28 is a block diagram for illustrating the mobile electronic device of FIG. 27. For convenience of description, components duplicate with those as described using FIG. 1 to FIG. 23 are briefly described or descriptions thereof are omitted.

Referring to FIG. 27, the mobile electronic device 3000 may include a foldable housing 3110, a display device 3130, a first camera module 3200 and a second camera module 3300. In this connection, the foldable housing 3110 may include a first housing 3010 and a second housing 3020 which are foldable relative to each other along a folding axis 3120. The first housing 3010 and the second housing 3020 may face toward each other in a folded state.

When the mobile electronic device 3000 is not in the folded state, the first housing 3010 and the second housing 3020 may constitute a planar structure. At this time, a display device 3130 may constitute a planar structure. However, when the mobile electronic device 3000 is in the folded state, the first housing 3010 and the second housing 3020 may face toward each other.

Figure 28:
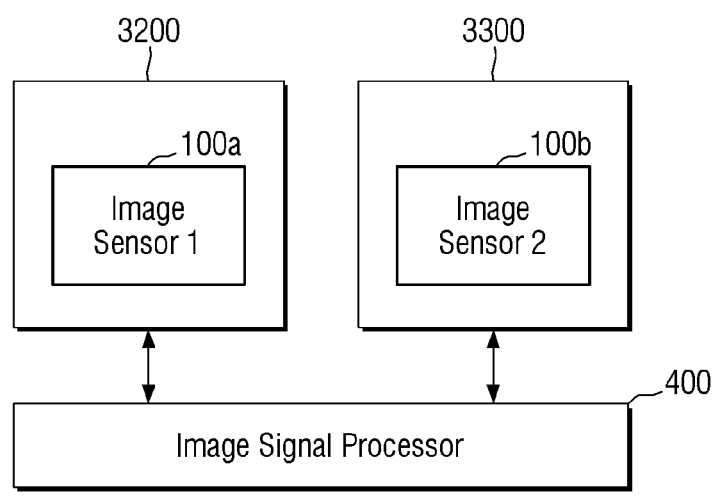
FIG. 28 is a block diagram for illustrating the mobile electronic device of FIG. 27.

Referring to FIG. 28, the first camera module 3200 may include the first image sensor 100*a* and the second camera module 3300 may include the second image sensor 100*b*. The image signal processor 400 may generate the statistic data STD based on the first image signal IMGS1 from the first camera module 3200 and the second image signal IMGS2 from the second camera module 3300.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure, but to describe the present disclosure. The scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. An image signal processor comprising:
a statistic data generating circuit configured to receive a first image signal and a second image signal from an external device;
an image processor configured to receive the first image signal and the second image signal; and
a direct memory access circuit connected to the statistic data generating circuit and the image processor, wherein:
the statistic data generating circuit is configured to perform first image pre-processing on the first image signal and to generate first statistic data based on the first image signal subjected to the first image pre-processing and is further configured to perform first image pre-processing on the second image signal and to generate second statistic data based on the second image signal subjected to the first image pre-processing,
the direct memory access circuit is configured to store the first statistic data and the second statistic data therein and to provide the stored first statistic data and the stored second statistic data to the image processor, and
the image processor is configured to perform second image pre-processing on the first image signal and to perform image processing on the first image signal based on the first statistic data and on the second statistic data.

2. The image signal processor of claim 1, wherein:
the first statistic data and the second statistic data include at least one of statistic data about auto focus, statistic data about auto exposure, statistic data about auto white balance, statistic data about local tone mapping, statistic data about motion measurement data, and statistic data about facial recognition, and
the direct memory access circuit provides the first statistic data and the second statistic data to the external device.

3. The image signal processor of claim 1, wherein:
the statistic data generating circuit is configured to perform down-scaling on the first image signal subjected to the first image pre-processing, thereby generating a corrected first image signal, and
a data capacity of the corrected first image signal is smaller than a data capacity of the first image signal subjected to the first image pre-processing.

4. The image signal processor of claim 1, wherein:
the statistic data generating circuit performs down-scaling on the first image signal to generate a downscaled first image signal before performing the first image pre-processing,
the statistic data generating circuit performs the first image pre-processing on the downscaled first image signal, and
a data capacity of the downscaled first image signal is smaller than a data capacity of the first image signal.

5. The image signal processor of claim 1, wherein:
the image signal processor further comprises a binning module configured to:
receive the first image signal from the external device;
perform binning on the image signal to generate a binned first image signal; and
provide the binned first image signal to the statistic data generating circuit, and
a data capacity of the binned first image signal is smaller than a data capacity of the first image signal transmitted to the image processor.

6. The image signal processor of claim 5, wherein:
the first image signal has one of a tetra pattern, a nona pattern, and a hexadeca pattern, and the binned first image signal has a Bayer pattern.

7. The image signal processor of claim 1, wherein the first image pre-processing is identical with the second image pre-processing.

8. The image signal processor of claim 1, wherein an operation of the statistic data generating circuit on an image signal of a first frame is performed separately from an operation of the image processor on the image signal of the first frame.

9. The image signal processor of claim 8, wherein an operation of the statistic data generating circuit on an image signal of a second frame, subsequent to the first frame, is performed simultaneously with an operation of the image processor on the image signal of the first frame.

10. An image sensing device comprising:
a first camera circuit including a first image sensor configured to generate a first image signal;
a second camera circuit including a second image sensor configured to generate a second image signal;
a statistic data generating circuit configured to receive the first and second image signals, generate first statistic data based on the first image signal, and generate second statistic data based on the second image signal; and
an image processor configured to select one of the first and second image signals and perform image processing on the selected one of the first and second image signals based on the first and second statistic data.

11. The image sensing device of claim 10, wherein the image processor is configured to perform image processing on the second image signal separately from performing image processing on the first image signal.

12. The image sensing device of claim 10, wherein the first camera circuit is controlled based on the first statistic data and the second camera circuit is controlled based on the second statistic data.

13. The image sensing device of claim 10, wherein:
the image processor includes different first and second sub-image processors,
the first sub-image processor performs image processing on the first image signal,
the second sub-image processor performs image processing on the second image signal, and
while the first sub-image processor is operating, the second sub-image processor does not operate.

14. The image sensing device of claim 10, wherein:
the image processor includes an image pre-processor and an image post-processor different from the image pre-processor, and
the image pre-processor performs bad pixel correction based on the first and second statistic data.

15. The image sensing device of claim 10, wherein:
the statistic data generating circuit is configured to perform downscaling on the first and second image signals to generate first and second downscaled image signals before generating the first and second statistic data,
the statistic data generating circuit is configured to generate the first statistic data based on the first downscaled image signal and to generate the second statistic data based on the second downscaled image signal,
a data capacity of the first downscaled image signal is smaller than a data capacity of the first image signal, and
a data capacity of the second downscaled image signal is smaller than a data capacity of the second image signal.

16. A method for sensing an image, the method comprising:
outputting, by a first image sensor, a first image signal of a first frame during a first time period;
outputting, by a second image sensor, a second image signal of the first frame during the first time period;
receiving, by an image signal processor, the first image signal of the first frame and the second image signal of the first frame,
generating, by the image signal processor, first statistic data based on the first image signal of the first frame and second statistic data of the second image signal of the first frame during a second time period partially overlapping the first time period; and
performing, by the image signal processor, image processing on the first image signal of the first frame based on the first statistic data and on the second statistic data during a third time period that is subsequent to the first and second time periods and non-overlapping with the second time period.

17. The method of claim 16, further comprising:
performing, by the image signal processor, image pre-processing on the first image signal of the first frame during the third time period; and
performing, by the image signal processor, image post-processing on the first image signal of the first frame during a fourth time period partially overlapping with the third time period.

18. The method of claim 16, further comprising:
performing, by the image signal processor, image pre-processing on the first image signal of the first frame during a fourth time period partially overlapping the second time period; and performing, by the image signal processor, image post-processing on the first image signal of the first frame during the third time period.

19. The method of claim 16, wherein the generating of the first statistic data includes performing downscaling on the first image signal of the first frame to generate a downscaled first image signal and generating the first statistic data based on the downscaled first image signal.

20. The method of claim 16, further comprising controlling the first image sensor based on the first statistic data and the second statistic data.

* * * * *